(12) United States Patent
Fong et al.

(10) Patent No.: US 11,943,768 B2
(45) Date of Patent: Mar. 26, 2024

(54) CONFIGURATION FOR REQUESTING SEMI-PERSISTENTLY SCHEDULED RESOURCES

(71) Applicant: QUALCOMM Incorporated, San Diego, CA (US)

(72) Inventors: Lik Hang Silas Fong, Bridgewater, NJ (US); Piyush Gupta, Bridgewater, NJ (US); Peter Gaal, San Diego, CA (US); Jing Sun, San Diego, CA (US); Xiaojie Wang, Hillsborough, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 322 days.

(21) Appl. No.: 16/951,937

(22) Filed: Nov. 18, 2020

(65) Prior Publication Data
US 2022/0159638 A1    May 19, 2022

(51) Int. Cl.
*H04W 72/20* (2023.01)

(52) U.S. Cl.
CPC .................. *H04W 72/20* (2023.01)

(58) Field of Classification Search
None
See application file for complete search history.

(56) References Cited

U.S. PATENT DOCUMENTS

| | | | | |
|---|---|---|---|---|
| 2013/0322339 A1* | 12/2013 | Ohta | ........................ | H04L 5/001 370/328 |
| 2017/0071010 A1* | 3/2017 | Lim | ...................... | H04W 72/21 |
| 2018/0270698 A1* | 9/2018 | Babaei | .................. | H04W 72/21 |
| 2018/0368023 A1* | 12/2018 | Hong | ................ | H04W 28/0278 |
| 2019/0029033 A1* | 1/2019 | Tang | ................ | H04W 28/0278 |
| 2019/0090264 A1* | 3/2019 | Xiao | ...................... | H04W 72/21 |
| 2019/0191416 A1* | 6/2019 | Xie | ........................ | H04W 72/23 |
| 2019/0230654 A1 | 7/2019 | Luo et al. | | |
| 2020/0374748 A1* | 11/2020 | Ahn | ...................... | H04W 28/04 |

OTHER PUBLICATIONS

International Search Report and Written Opinion - PCT/US2021/054186 - ISA/EPO - 2022-02-02 (207621WO).
Nokia, et al., "Enhanced Semi-Persistent Scheduling for 5G Urllc", 3GPP Draft, 3GPP Tsg- Ran WG1 #87, R1-1612251_URLLC_SPS_ Final, 3rd Generation Partnership Project (3GPP), Mobile Competence Centre, 650, Route Des Lucioles, F-06921 Sophia-Antipolis Cedex, France, vol. Ran WG1, No. Reno, USA, 20161114 - 20161118, Nov. 5, 2016 (2016-11- 05), XP051190365, 8 Pages, Chapters 2.2, 2.3, Retrieved from the Internet: URL: https://www.3gpp.org/ftp/tsg_ran/WG1_RL1/TSGR1_87/Docs/ [retrieved on 2016-11-05], See Section 2, Section 2.1, Figure 1.

* cited by examiner

*Primary Examiner* — Nguyen H Ngo
(74) *Attorney, Agent, or Firm* — Holland & Hart LLP

(57) ABSTRACT

Methods, systems, and devices for wireless communications at a device are described. The device may receive an indication of a configuration that schedules semi-persistently scheduled resources for transmissions from the first device. The device may also receive an indication of a set of resources available to the first device for requesting a set of the semi-persistently scheduled resources configured for the first device. The device may transmit a message over the set of resources to request the set of semi-persistently scheduled resources.

15 Claims, 15 Drawing Sheets

CONFIGURATION FOR REQUESTING SEMI-PERSISTENTLY SCHEDULED RESOURCES

FIELD OF TECHNOLOGY

The following relates to wireless communications at a first device, including resource configuration for requesting semi-persistently scheduled resources.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some examples, UEs may engage in direct communications that are not routed through a base station or other intermediary device. Direct communications may present various challenges.

SUMMARY

The described techniques relate to improved methods, systems, devices, and apparatuses that support resource configuration for requesting semi-persistently scheduled (SPS) resources. Generally, the described techniques provide for a first device to allocate SPS resources configured for a second device. The first device may allocate the SPS resources to the second device if the second device requests allocation by transmitting a message over resources configured for the request. The first device may allocate the SPS resources to a third device if the second device fails to request the SPS resources.

A method for wireless communication at a first device is described. The method may include receiving an indication of a configuration that schedules semi-persistently-scheduled resources for data transmissions from the first device, receiving, from a second device, an indication of a set of resources available to the first device for requesting a set of the semi-persistently-scheduled resources configured for the first device, and transmitting a message over the set of resources to request the set of semi-persistently-scheduled resources.

An apparatus for wireless communication at a first device is described. The apparatus may include a processor, memory in electronic communication with the processor, and instructions stored in the memory. The instructions may be executable by the processor to cause the apparatus to receive an indication of a configuration that schedules semi-persistently-scheduled resources for data transmissions from the first device, receive, from a second device, an indication of a set of resources available to the first device for requesting a set of the semi-persistently-scheduled resources configured for the first device, and transmit a message over the set of resources to request the set of semi-persistently-scheduled resources.

Another apparatus for wireless communication at a first device is described. The apparatus may include means for receiving an indication of a configuration that schedules semi-persistently-scheduled resources for data transmissions from the first device, means for receiving, from a second device, an indication of a set of resources available to the first device for requesting a set of the semi-persistently-scheduled resources configured for the first device, and means for transmitting a message over the set of resources to request the set of semi-persistently-scheduled resources.

A non-transitory computer-readable medium storing code for wireless communication at a first device is described. The code may include instructions executable by a processor to receive an indication of a configuration that schedules semi-persistently-scheduled resources for data transmissions from the first device, receive, from a second device, an indication of a set of resources available to the first device for requesting a set of the semi-persistently-scheduled resources configured for the first device, and transmit a message over the set of resources to request the set of semi-persistently-scheduled resources.

Some examples of the method, apparatuses, and non-transitory computer-readable medium described herein may further include operations, features, means, or instructions for receiving, from the second device, a message indicating feedback responsive to the message that requests the set of semi-persistently-scheduled resources and transmitting data over at least a subset of the set of semi-persistently-scheduled resources based on receiving the message indicating the feedback.

Some examples of the method, apparatuses, and non-transitory computer-readable medium described herein may further include operations, features, means, or instructions for determining that a message indicating feedback responsive to the message that requests the set of semi-persistently-scheduled resources may have not been received within a threshold duration of time and refraining from transmitting data over the set of semi-persistently-scheduled resources based on the determination.

Some examples of the method, apparatuses, and non-transitory computer-readable medium described herein may further include operations, features, means, or instructions for transmitting data in a first subset of the set of semi-persistently-scheduled resources based on transmitting the message that requests the set of semi-persistently-scheduled resources and transmitting a second message indicating that a second subset of the set of semi-persistently-scheduled resources will not be used by the first device.

In some examples of the method, apparatuses, and non-transitory computer-readable medium described herein, the second message may be transmitted over a third subset of the set of semi-persistently-scheduled resources.

In some examples of the method, apparatuses, and non-transitory computer-readable medium described herein, the set of semi-persistently-scheduled resources includes the set of resources for requesting the set of the semi-persistently-scheduled resources.

Some examples of the method, apparatuses, and non-transitory computer-readable medium described herein may further include operations, features, means, or instructions for receiving a message indicating a type of message for transmission over the set of resources to request the set of the semi-persistently-scheduled resources.

In some examples of the method, apparatuses, and non-transitory computer-readable medium described herein, the set of semi-persistently-scheduled resources may be associated with the set of resources.

In some examples of the method, apparatuses, and non-transitory computer-readable medium described herein, the set of semi-persistently-scheduled resources includes a quantity of consecutive instances of semi-persistently-scheduled resources and the method, apparatuses, and non-transitory computer-readable medium may include further operations, features, means, or instructions for receiving a message indicating the quantity of consecutive instances or a duration of time that includes the quantity of consecutive instances.

Some examples of the method, apparatuses, and non-transitory computer-readable medium described herein may further include operations, features, means, or instructions for receiving a message indicating a periodicity associated with the set of resources, where the message that requests the set of semi-persistently-scheduled resources may be transmitted based on the periodicity.

Some examples of the method, apparatuses, and non-transitory computer-readable medium described herein may further include operations, features, means, or instructions for determining that the first device may have data for the second device, where the message that requests the set of semi-persistently-scheduled resources may be transmitted based on the determination.

A method for wireless communication at a first device is described. The method may include configuring semi-persistently-scheduled resources for a second device, transmitting an indication of a set of resources available to the second device for requesting a set of the semi-persistently-scheduled resources configured for the second device, and communicating data over at least a subset of the set of semi-persistently-scheduled resources configured for the second device based on transmitting the indication of the set of resources.

An apparatus for wireless communication at a first device is described. The apparatus may include a processor, memory in electronic communication with the processor, and instructions stored in the memory. The instructions may be executable by the processor to cause the apparatus to configure semi-persistently-scheduled resources for a second device, transmit an indication of a set of resources available to the second device for requesting a set of the semi-persistently-scheduled resources configured for the second device, and communicate data over at least a subset of the set of semi-persistently-scheduled resources configured for the second device based on transmitting the indication of the set of resources.

Another apparatus for wireless communication at a first device is described. The apparatus may include means for configuring semi-persistently-scheduled resources for a second device, means for transmitting an indication of a set of resources available to the second device for requesting a set of the semi-persistently-scheduled resources configured for the second device, and means for communicating data over at least a subset of the set of semi-persistently-scheduled resources configured for the second device based on transmitting the indication of the set of resources.

A non-transitory computer-readable medium storing code for wireless communication at a first device is described. The code may include instructions executable by a processor to configure semi-persistently-scheduled resources for a second device, transmit an indication of a set of resources available to the second device for requesting a set of the semi-persistently-scheduled resources configured for the second device, and communicate data over at least a subset of the set of semi-persistently-scheduled resources configured for the second device based on transmitting the indication of the set of resources.

Some examples of the method, apparatuses, and non-transitory computer-readable medium described herein may further include operations, features, means, or instructions for receiving a message over the set of resources for requesting the set of semi-persistently-scheduled resources, where the data may be received from the second device after the message may be received.

Some examples of the method, apparatuses, and non-transitory computer-readable medium described herein may further include operations, features, means, or instructions for transmitting, to the second device, a message indicating feedback responsive to the message for requesting the set of semi-persistently-scheduled resources, where the data may be received based on transmitting the message indicating the feedback.

Some examples of the method, apparatuses, and non-transitory computer-readable medium described herein may further include operations, features, means, or instructions for determining that the second device may have not transmitted a message over the set of resources for requesting the set of semi-persistently-scheduled resources and re-allocating the semi-persistently-scheduled resources to a third device.

In some examples of the method, apparatuses, and non-transitory computer-readable medium described herein, the data may be received from the second device and the method, apparatuses, and non-transitory computer-readable medium may include further operations, features, means, or instructions for receiving from the second device a second message indicating that a second subset of the set of semi-persistently-scheduled resources will not be used by the second device and re-allocating the second subset of the set of semi-persistently-scheduled resources to a third device based on receiving the second message.

In some examples of the method, apparatuses, and non-transitory computer-readable medium described herein, the data may be received from the second device and the method, apparatuses, and non-transitory computer-readable medium may include further operations, features, means, or instructions for determining that a threshold duration of time may have elapsed since receipt of the data and re-allocating a second subset of the set of semi-persistently-scheduled resources to a third device based on the determination.

Some examples of the method, apparatuses, and non-transitory computer-readable medium described herein may further include operations, features, means, or instructions for transmitting a message indicating a type of message the second device may be to transmit over the set of resources to request the set of the semi-persistently-scheduled resources.

In some examples of the method, apparatuses, and non-transitory computer-readable medium described herein, the set of semi-persistently-scheduled resources may be associated with the set of resources.

In some examples of the method, apparatuses, and non-transitory computer-readable medium described herein, the set of semi-persistently-scheduled resources includes a quantity of consecutive instances of semi-persistently-scheduled resources and the method, apparatuses, and non-transitory computer-readable medium may include further operations, features, means, or instructions for transmitting a message indicating the quantity of consecutive instances or a duration of time that includes the quantity of consecutive instances.

In some examples of the method, apparatuses, and non-transitory computer-readable medium described herein, the set of semi-persistently-scheduled resources includes the set of resources for requesting the set of the semi-persistently-scheduled resources.

Some examples of the method, apparatuses, and non-transitory computer-readable medium described herein may further include operations, features, means, or instructions for transmitting a message indicating a periodicity associated with the set of resources, where the message for requesting the set of semi-persistently-scheduled resources may be received based on the periodicity.

DETAILED DESCRIPTION

A wireless communication network may include devices that are capable of direct communications (e.g., communications that are not routed through a base station or other intermediary device). For example, in a factory setting there may be a controlling device (e.g., a programmable logic controller (PLC)) that not only communicates with a base station but also communicates with other devices (e.g., sensors, actuators) by using radio resources that are reserved for direct (or "sidelink") communications. To ensure that a device can consistently communicate data with minimal signaling overhead, the controlling device may configure the device with semi-persistently scheduled (SPS) resources (e.g., frequency resources that are periodically allocated to the device). But in some cases the device may not have data to transmit to the controlling device when SPS resources occur, which means that the SPS resources may go unused. Unused SPS resources may reduce system efficiency and throughput, among other disadvantages that degrade system performance.

According to the techniques described herein, a first device (e.g., a PLC) may improve system performance by re-allocating unused SPS resources configured for a second device to a third device or use the unused SPS resources for its own transmissions. To determine the use status of the SPS resources, the first device may configure a set of resources, referred to as "restart resources," that the second device can use to request (or "claim") the SPS resources. If the second device transmits a message over the restart resources, the first device may know that the second device wishes to use the SPS resources and, accordingly, restart (e.g., allocate) the SPS resources for the second device. If the second device does not transmit a message over the restart resources, the first device may know that the second device has no use for the SPS resources and, accordingly, re-allocate the SPS resources to the third device. Thus, SPS resources configured for the second device may be used even when the second device has no data to transmit.

Aspects of the disclosure are initially described in the context of a wireless communications system. Aspects of the disclosure are further described in the context of an additional wireless communications system and process flows. Aspects of the disclosure are further illustrated by and described with reference to apparatus diagrams, system diagrams, and flowcharts that relate to various aspects of radio link management.

Figure 1:
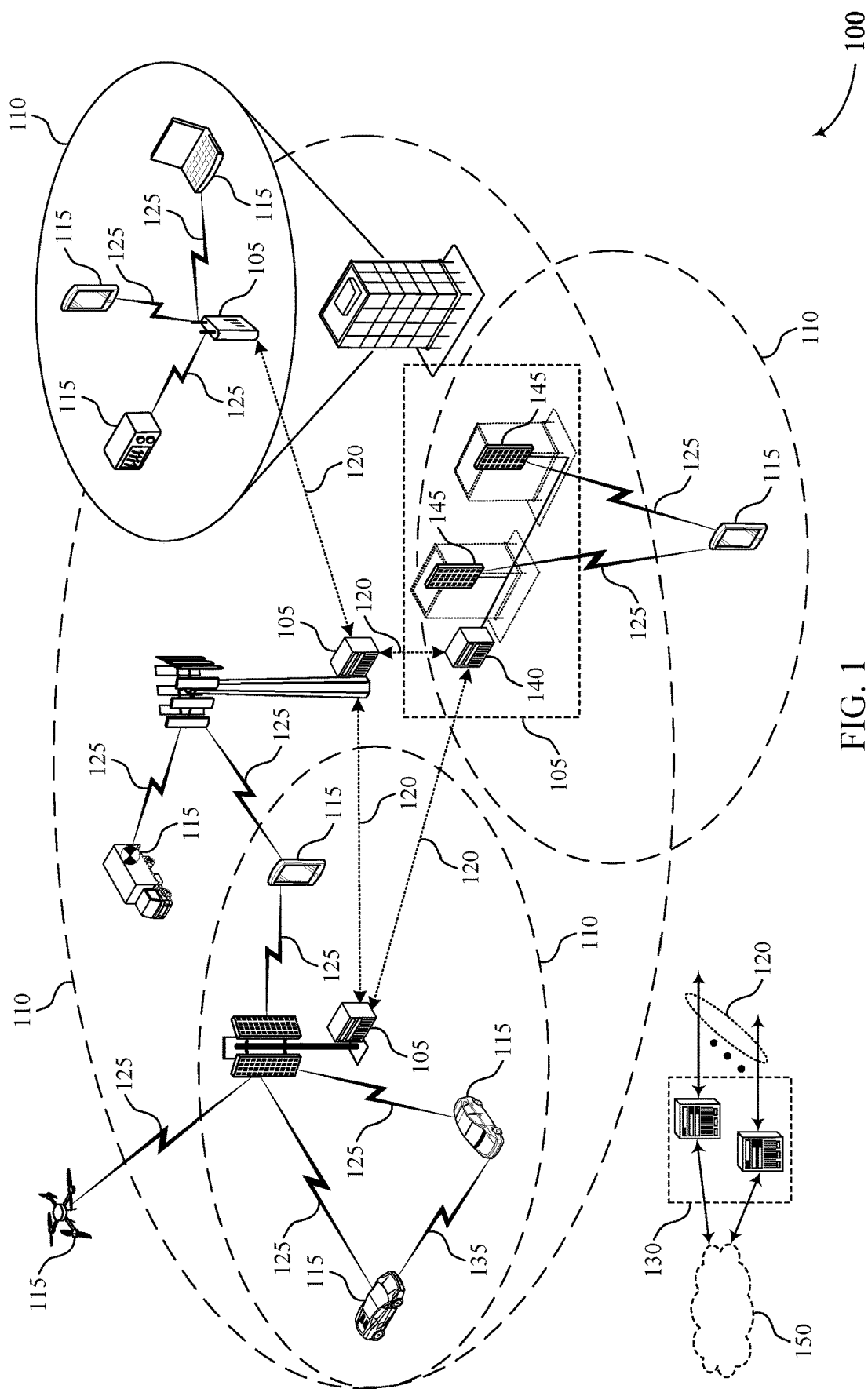
FIG. 1 illustrates an example of a wireless communications system that supports resource configuration for requesting semi-persistently scheduled resources in accordance with aspects of the present disclosure.

FIG. 1 illustrates an example of a wireless communications system 100 that supports resource configuration for requesting semi-persistently scheduled resources in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system.

In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, the UEs 115 may engage in direct (or "sidelink") communications, which may be communications that are not routed through a base station 105 or other intermediary device. For instance, a first UE 115 may configure a second UE 115 with sidelink SPS resources that occur periodically. Such a scenario may occur, for example, in a factory setting where a first UE (e.g., a PLC) configures a second UE (e.g., a sensor, an actuator) with SPS resources so that the second UE can report data without the overhead associated with dynamic scheduling. However, some instances of the SPS resources may go unused if the second UE does not have any data to report when those instances occur. Unused SPS resources may reduce the efficiency and throughput of wireless communications system 100, among other disadvantages.

According to the techniques described herein, a first UE 115 may prevent SPS resources from going unused by allocating SPS resources configured for a second UE 115 to either the second UE 115—if the second UE 115 has traffic (e.g., pending data, buffered data) for the first UE 115—or another UE 115. To do so, the first UE 115 may configure the second UE 115 with restart resources that the second UE 115 can use to request, claim, or otherwise secure the SPS resources. For example, if the second UE 115 has traffic for the first UE 115, the second UE 115 may request a set of SPS resources associated with the restart resources by transmitting a message of a predetermined type over the restart resources. If the second UE 115 does not transmit a message over the restart resources, the first UE 115 may re-allocate the set of SPS resources to another UE 115. In some examples, rather than re-allocating the set of SPS resources to another UE 115, the first UE 115 may use the set of SPS resources to transmit data to one or more UEs 115. Thus, the first UE 115 may ensure that SPS resources do not go unused, which may improve the performance of the wireless communications system 100.

Figure 2:
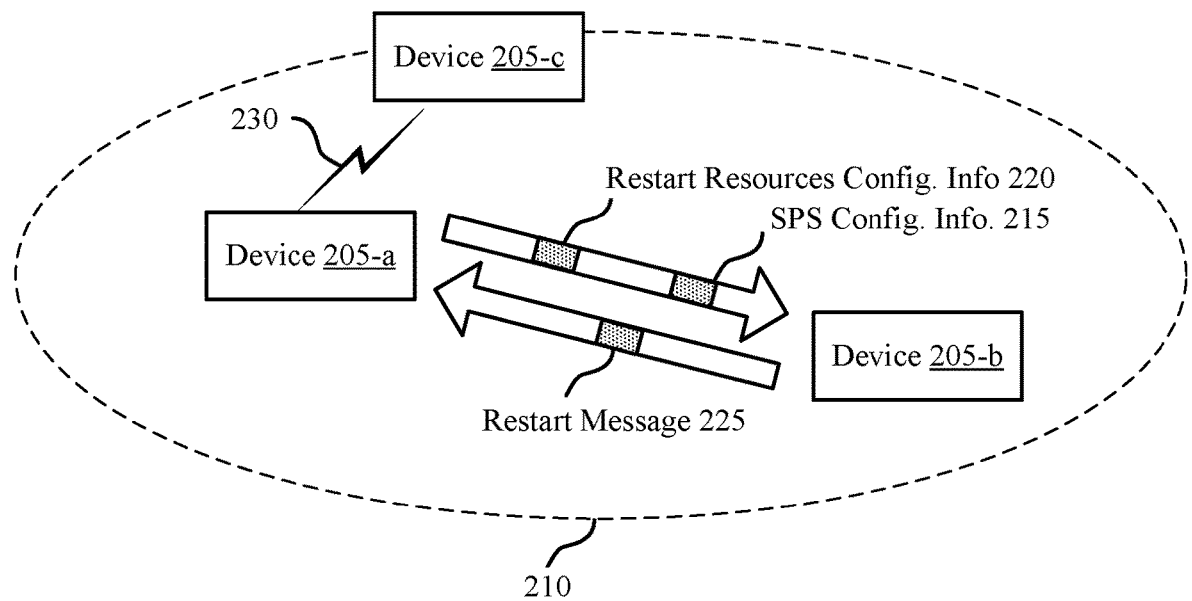
FIG. 2 illustrates an example of a wireless communications system that supports resource configuration for requesting semi-persistently scheduled resources in accordance with aspects of the present disclosure.

FIG. 2 illustrates an example of a wireless communications system 200 that supports resource configuration for requesting semi-persistently scheduled resources in accordance with aspects of the present disclosure. In some examples, the wireless communications system 200 may implement aspects of the wireless communications system 100. For example, the wireless communications system 200 may include device 205-a, device 205-b, and device 205-c, which may be examples of UEs 115 as described with reference to FIG. 1. To ensure that SPS resources configured for device 205-b are used, device 205-a may allocate configured SPS resources for device 205-b based on the traffic—or lack thereof—at device 205-b. Thus, device 205-a may implement a traffic-driven restart technique for sidelink SPS. Although described with reference to sidelink communications, the techniques described herein may be implemented for other types of communications, and thus may performed by a base station or other type of device.

Device 205-a may communicate with other devices within its coverage area 210. For example, device 205-a may communicate with device 205-b and device 205-c, among other devices (not shown). The communications may be routed through an intermediary device (e.g., a base station) or may be exchanged directly between device 205-a and another device 205, a technique which may be referred to as sidelink communication when the devices 205 are UEs. Communications between device 205-a and a base station may occur through a first interface (e.g., the Uu interface) whereas sidelink communications between device 205-a and another device 205 may occur through a second interface (e.g., the PC5 interface). In some examples, communications between a device 205 and a base station may be referred to as Uu communications.

Device 205-a may support multiple resource allocation modes for sidelink communications. For example, device 205-a may implement sidelink communications with another device in Mode 1 or in Mode 2, which may be V2X modes. In Mode 1, a base station may not only configure sidelink resources for device 205-a but also schedule communications between device 205-a and another device 205 over the configured sidelink resources. For example, the base station may send device 205-a downlink control information (DCI) (e.g., DCI3_0) that includes a dynamic grant indicating the resources (e.g., time and frequency) for one or more sidelink transmissions by device 205-a. Additionally or alternatively, the base station may use RRC signaling to schedule the sidelink resources for device 205-a.

In Mode 2, a base station may configure device 205-a with sidelink resources, but the scheduling of those resources may be performed by device 205-a (as opposed to the base station). For example, device 205-a may use sidelink control information (SCI) (e.g., SCI1, SCI2) to schedule a subset of the configured sidelink resources for communications by device 205-5 or another device. SCI1 may be transmitted in a physical sidelink control channel (PSCCH) and SCI2 may be transmitted in a physical sidelink shared channel (PSSCH), which may also be used to convey the scheduled data. The PSSCH may be used for unicast communications, groupcast communications, or broadcast communication. The SPS resources selected and scheduled by a device 205 may be based on one or more SCI1 messages and/or based on reference signal received power (RSRP) measurements of modulation signals (e.g., demodulation reference signals (DMRS)) in the PSSCH or the PSCCH. In some examples, the device 205 that schedules sidelink resources may be a more sophisticated, intelligent, or advanced device than the device for which the sidelink resources are scheduled. For instance, the scheduling device 205 may be a PLC or other device with more capabilities than the scheduled device.

Transmissions from a scheduling device may be referred to as forward transmissions whereas transmissions to a scheduling device may be referred to as reverse transmissions. So, direct communications from device 205-b to device 205-a may be referred to as reverse sidelink communications.

Upon receipt of sidelink data, device 205-a may transmit HARQ feedback (e.g., in physical sidelink feedback channel (PSFCH)) to the transmitting device. For example, device 205-a may transmit an acknowledgement (ACK) over the PSFCH if device 205-a successfully decodes the received data. Alternatively, device 205-a may transmit a negative-acknowledgement (NACK) over the PSFCH if device 205-a is unable to decode the received data (e.g., so that the data can be re-transmitted). Sidelink HARQ feedback may be explicitly signaled for unicast or groupcast transmissions. Alternatively, implicit NACK (where a NACK is assumed if an ACK is not received) may be used for groupcast transmissions.

In some examples, device 205-a (which may be operating in Mode 2) may configure device 205-b with SPS resources so that device 205-b can transmit data to device 205-a without a dynamic grant. Such a technique may be particularly useful for high priority data, small data payloads, or periodic data, among others. To configure device 205-b with the SPS, device 205-a may transmit SPS configuration information, such as SPS configuration information 215, to device 205-b. The SPS configuration information may indicate one or more parameters associated with the SPS configuration, such as the starting time, the frequency, the periodicity, and/or the length (number of slots) of the SPS resources. Device 205-b may use the configured SPS resources to periodically transmit data to device 205-a. However, according to the techniques described herein, the SPS resources configured for device 205-b may not be automatically allocated to device 205-b (e.g., for efficiency reasons). So, device 205-b may secure the allocation of SPS resources before device 205-b transmits on those SPS resources. Such a process may be referred to as restarting the SPS resources, and may be based on device 205-b having data for device 205-a.

Device 205-b may restart a set of SPS resources by transmitting a message (e.g., restart message 225) to device 205-a over restart resources associated with the set of SPS resources. Device 205-a may configure device 205-b with the restart resources using restart resources configuration information 220, which may indicate one or more parameters associated with the restart resources. Upon receiving the restart message 225, device 205-a may allocate to device 205-b the set of SPS resources associated with the restart resources. That is, the restart message 225 may indicate to device 205-a that the device 205-b has data to transmit or otherwise intends to use the set of SPS resources, and as such, the device 205-a may anticipate receiving data from device 205-b on the set of SPS resources, and may refrain from re-allocating the set of SPS resources to another device 205.

Alternatively, device 205-b may decide not to utilize or restart the set of SPS resources (e.g., because device 205-b does not have data for device 205-a). In such a scenario, device 205-b may refrain from transmitting a message over the restart resources. Upon determining that a restart message is absent from the restart resources, device 205-a may allocate to device 205-c the set of SPS resources associated with the restart resources. This way, the re-allocated set of SPS resources configured for device 205-b may be used for communications between device 205-a and device 205-c (e.g., using communication link 230).

Thus, device 205-a may allocate the SPS resources based on the traffic—or lack thereof—at device 205-b, which may ensure that SPS resources configured for device 205-b do not go unused. Such techniques may be referred to as traffic-driven restart techniques for SPS sidelink resources.

Figure 3:
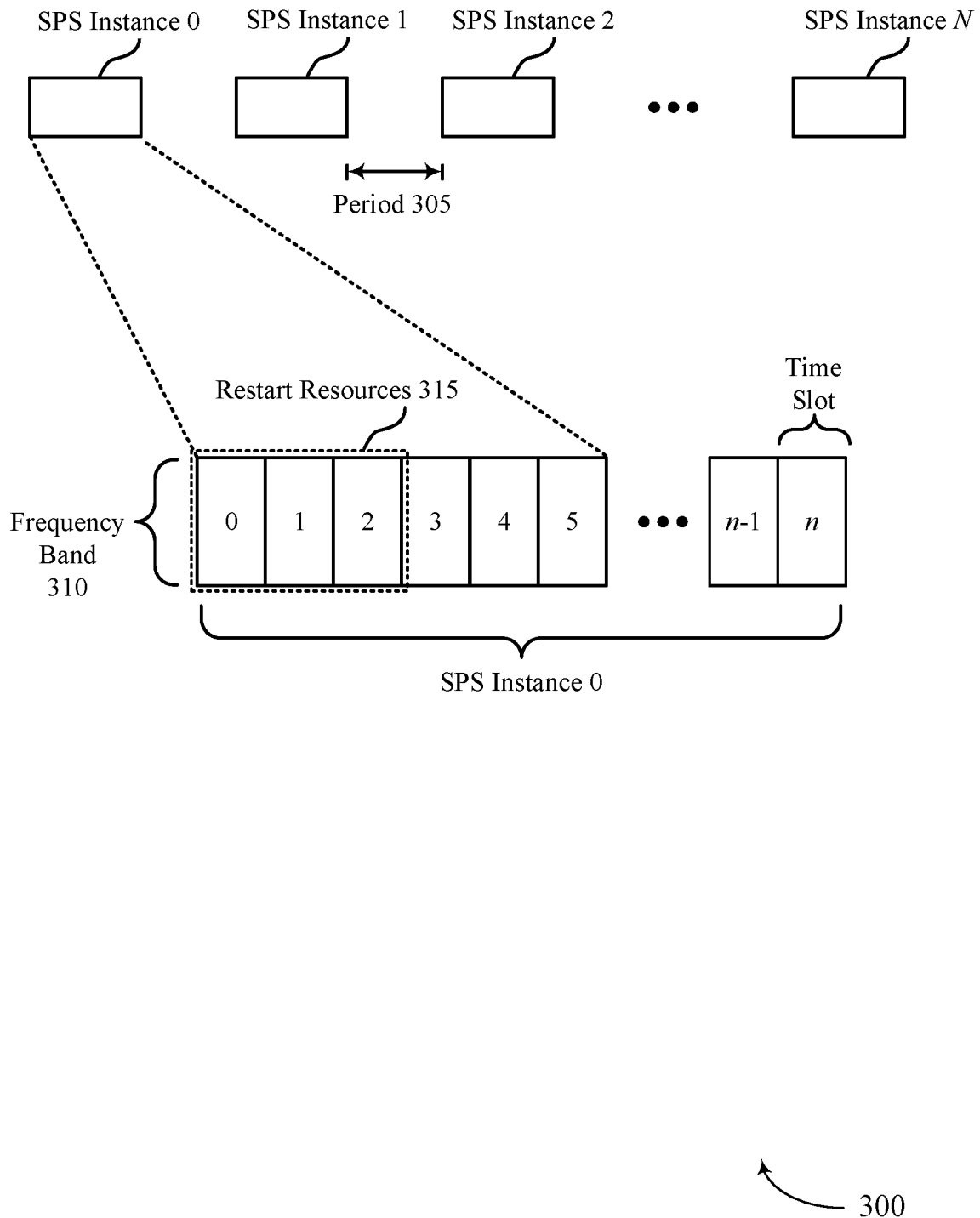
FIG. 3 illustrates an example of SPS resources that support resource configuration for requesting semi-persistently scheduled resources in accordance with aspects of the present disclosure.

FIG. 3 illustrates an example of SPS resources 300 that supports resource configuration for requesting semi-persistently scheduled resources in accordance with aspects of the present disclosure. The SPS resources 300 may be an example of SPS resources configured for a device as described herein. To ensure that the SPS resources 300 are used, the configuring device may allocate the SPS resources 300 based on the presence or absence of traffic at the device for which the SPS resources 300 are configured. For ease of reference, the configuring device may be referred to in FIG. 3 as the first device and the configured device may be referred to as the second device.

The SPS resources 300 may include multiple instances of SPS resources (e.g., SPS instance 0 through SPS instance N), which may be sets of time and frequency resources that occur periodically in the time domain. Thus, the SPS resources 300 may have a period 305. The SPS instances may be configured to occur indefinitely (e.g., until the SPS resources are explicitly deactivated) or for a configured amount of time. Each SPS instance may include n+1 time slots, which may be continuous in the time domain, and each SPS instance may also include a set of frequencies that make up frequency band 310.

The second device configured with SPS resources 300 may secure a set of the SPS resources before transmitting data over those resources. Otherwise, the set of SPS resources may be re-allocated to another device. To secure a set of SPS resources, the second device may transmit a restart message (e.g., a data message or other type of message) in the restart resources 315 associated with the set of SPS resources. The presence of the message may indicate to the first device that the second device wishes for the set of SPS resources associated with the restart resources 315 to be restarted. The set of SPS resources associated with the restart resources 315 may include the next x SPS instances or the SPS instances that occur within ay ms (relative to the restart resources 315), as configured by the first device. Put another way, the restart resources 315 may be associated with a configured quantity of SPS instances or a threshold duration of time. Alternatively, the restart resources 315 may be associated with an indefinite quantity of SPS instances (e.g., SPS resources may be allocated to the second device until a termination message is communicated by one of the devices).

The restart resources 315 may be transmitted over the full bandwidth of frequency band 310 or over a portion of the frequency band 310. Thus, the restart resources 315 may cover the same frequency resources occupied by a transmission on the SPS resources 300. As an illustration, the restart resources 315 may occupy m subchannels where each subchannel includes M resources blocks (RBs).

After transmitting the restart message in restart resources 315, the second device may determine whether the set of SPS resources is allocated to the second device based on the presence or absence of feedback for the restart message. If the second device does not receive feedback for the restart message within a threshold duration of time (e.g., within x time slots) of transmitting the restart message, the second device may determine that the set of SPS resources has not been restarted and may refrain from transmitting in the remaining resources of the set. If the second device does receive feedback for the restart message within the threshold duration of time, the second device may determine that the set of SPS resources has been restarted and may transmit data to the first device using the set of SPS resources.

In some examples, the threshold duration of time may be configured so that expiry of the duration falls within the restart resources 315 (or coincides with the end of the restart resources 315). For example, assuming that the second device transmits a restart message in time slot 0, the threshold duration of time may be set to two time slots so that the second device knows by the end of the restart resources 315 whether the set of SPS resources has been restarted. So, the restart resources 315 may in some examples be divided into two subsets of resources: a first subset of resources (e.g., time slot 0) in which a restart message is permitted or expected, and a second subset of resources (e.g., time slots 1 and 2) in which feedback is permitted or expected. In some examples, the threshold duration of time may be tracked via an early suspension timer.

Upon securing a set of SPS resources, the second device may transmit data in the set of SPS resources until the second device runs out of data for the first device or some other suspension event occurs. At this point, the second device may implicitly release any remaining SPS resources in the set of SPS resources by failing to transmit data for a threshold duration of time (which may be tracked via an early suspension timer). Alternatively, the second device may explicitly release the remaining SPS resources by transmitting a message to the first device indicating as much. Such a process may be referred to as early suspension, early termination, early release, or any other suitable terminology. Some or all of the released SPS resources may be re-allocated by the first device to another device, which may improve the efficiency of the system. For example, if the first device detects early suspension at time slot 5, the first device may re-allocate the remaining slots in that SPS instance (e.g., time slots 6 through n) to a third device, as well any remaining SPS instances in the set of SPS resources.

Although shown occurring once, in some examples, the first device may configure restart resources 315 to occur periodically (e.g., every nth SPS instance). Although shown included in an SPS instance, in some examples, restart resources 315 may be included in resources other than SPS resources 300.

Figure 4:
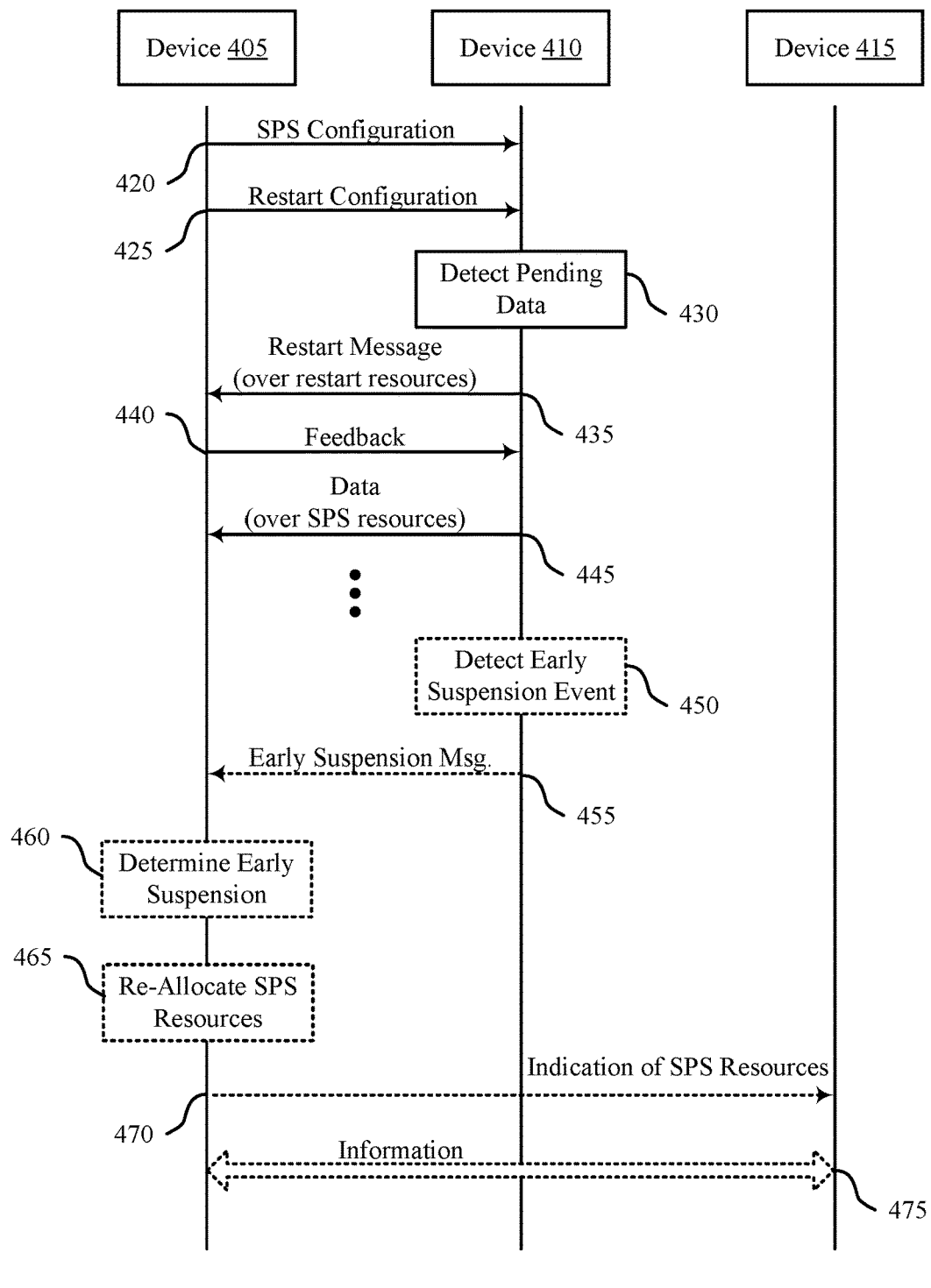
FIG. 4 illustrates an example of a process flow that supports resource configuration for requesting semi-persistently scheduled resources in accordance with aspects of the present disclosure.

FIG. 4 illustrates an example of a process flow 400 that supports resource configuration for requesting semi-persistently scheduled resources in accordance with aspects of the present disclosure. In some examples, process flow 400 may implement aspects of wireless communications system 100 or 200. For example, process flow 400 may be implemented by device 405, device 410, and device 415, which may be examples of a device as described herein. Process flow 400 may be an example of a traffic-driven restart technique for SPS sidelink resources as described herein. Specifically, process flow 400 illustrates an example in which device 410 restarts a set of SPS resources then releases the set of SPS resources early.

At 420, device 405 may transmit to device 410 an indication of an SPS configuration for device 410. The indication of the SPS configuration may include values for various SPS parameters, such as the starting time, the frequency, the periodicity, and/or the length (number of slots) of the SPS resources. The indication of the SPS configuration may be conveyed via higher layer signaling (e.g., RRC signaling) or lower layer signaling (e.g., in a DCI or a MAC control element (MAC-CE)).

At 425, device 405 may transmit to device 410 an indication of a restart configuration for device 410. The indication of the restart configuration may be conveyed via higher layer signaling (e.g., RRC signaling) or lower layer signaling (e.g., in a DCI or a MAC-CE). The indication of the restart configuration may include values for various restart parameters, such as the time and frequency of restart resources and/or a periodicity of the restart resources. In some examples, the restart configuration may define the set of SPS resources associated with the restart resources. In some examples, the restart configuration may define the type of message device 410 should use as a restart message. For example, the restart message may be a data message, a dummy message (e.g., an all-1 message), or some other type of message. In some examples, the restart configuration may define the type of message device 410 should use to release SPS resources. In some examples, the restart configuration may set the duration of time used for implicit early suspension. After 425, device 405 may monitor the restart resources for a possible restart message from device 410.

At 430, device 410 may determine that device 410 has traffic intended for device 405. For example, device 410 may detect that device 410 has data pending (e.g., buffered) for device 405. At 435, device 410 may transmit a restart message over the restart resources indicated at 425. The restart message may request allocation of the set of SPS resources associated with the restart resources. Device 410 may transmit the restart message based on determining that device 410 has traffic intended for device 405. The restart message may be a data message, a dummy message, or another type of message preconfigured by device 405.

At 440, device 405 may transmit feedback for the restart message based on the decoding status of the message. In some examples, the transmission of the feedback message coincides (e.g., temporally, in the time domain) with at least a portion of the restart resources, as described with reference to FIG. 3. In some examples, the feedback for the restart message may serve as a confirmation of restarting the set of SPS resources. After 440, device 405 may monitor the set of SPS resources for data from device 410.

At 445, device 410 may transmit to device 405 data based on receiving the feedback at 440. Device 410 may transmit the data over at least a subset of the set of SPS resources associated with the restart resources used at 435. Device 410 may continue to transmit data over the subsets of the set of SPS resources until device 410 has no more data for device 405 (or until another early suspension event occurs).

At 450, device 410 may determine that an early suspension event has occurred (e.g., device 410 may detect an absence of data for device 410). At 455, device 410 may transmit to device 405 an early suspension message that indicates device 410 has released any remaining SPS resources in the set of SPS resources. Device 410 may transmit the early suspension message based on detecting the early suspension event at 450. In some examples device 410 may transmit the early suspension message over a subset of the set of SPS resources.

At 460, device 405 may determine that early suspension of the set of SPS resources has occurred based on the early suspension message received at 455. Additionally or alternatively, device 405 may determine that early suspension has occurred based on an early suspension timer expiring. At 465, device 405 may re-allocate the remaining SPS resources in the set of SPS resources to one or more devices, such as device 415. Device 405 may re-allocate the remaining SPS resources for transmissions by device 405 (e.g., to device 415 and/or another device), for transmissions by device 415 (e.g., to device 405, and/or another device), or a combination thereof.

At 470, device 405 may transmit to device 415 an indication of the re-allocated SPS resources. In some examples, device 505 may schedule device 515 for communications over the set of SPS resources. If device 405 re-allocated the remaining SPS resources for transmissions by device 415, device 405 may, after 470, monitor the remaining SPS resources in set of SPS resources for data from device 415. At 475, device 405 and device 415 may communicate over the re-allocated SPS resources. For example, device 415 may transmit, and device 405 may receive, information for device 405 over at least a portion of the remaining SPS resources in the set of SPS resources.

Device 415 may transmit the data based on the indication of SPS resources received at 470. Additionally or alternatively, device 405 may transmit, and device 415 may receive, information for device 415 over at least a portion of the remaining SPS resources in the set of SPS resources.

Thus, device 405 may prevent the set of SPS resources from being wasted, even when device 410 does not have use for the entire set of SPS resources. Alternative examples of the foregoing may be implemented, where some operations are performed in a different order than described, are performed in parallel, or are not performed at all. In some cases, operations may include additional features not mentioned below, or further operations may be added. Additionally, certain operations may be performed multiple times or certain combinations of operations may repeat or cycle. The various indications and messages described herein and with reference to process flow 400 may be conveyed via higher layer signaling (e.g., RRC signaling) or lower layer signaling (e.g., in a DCI or a MAC-CE).

Figure 5:
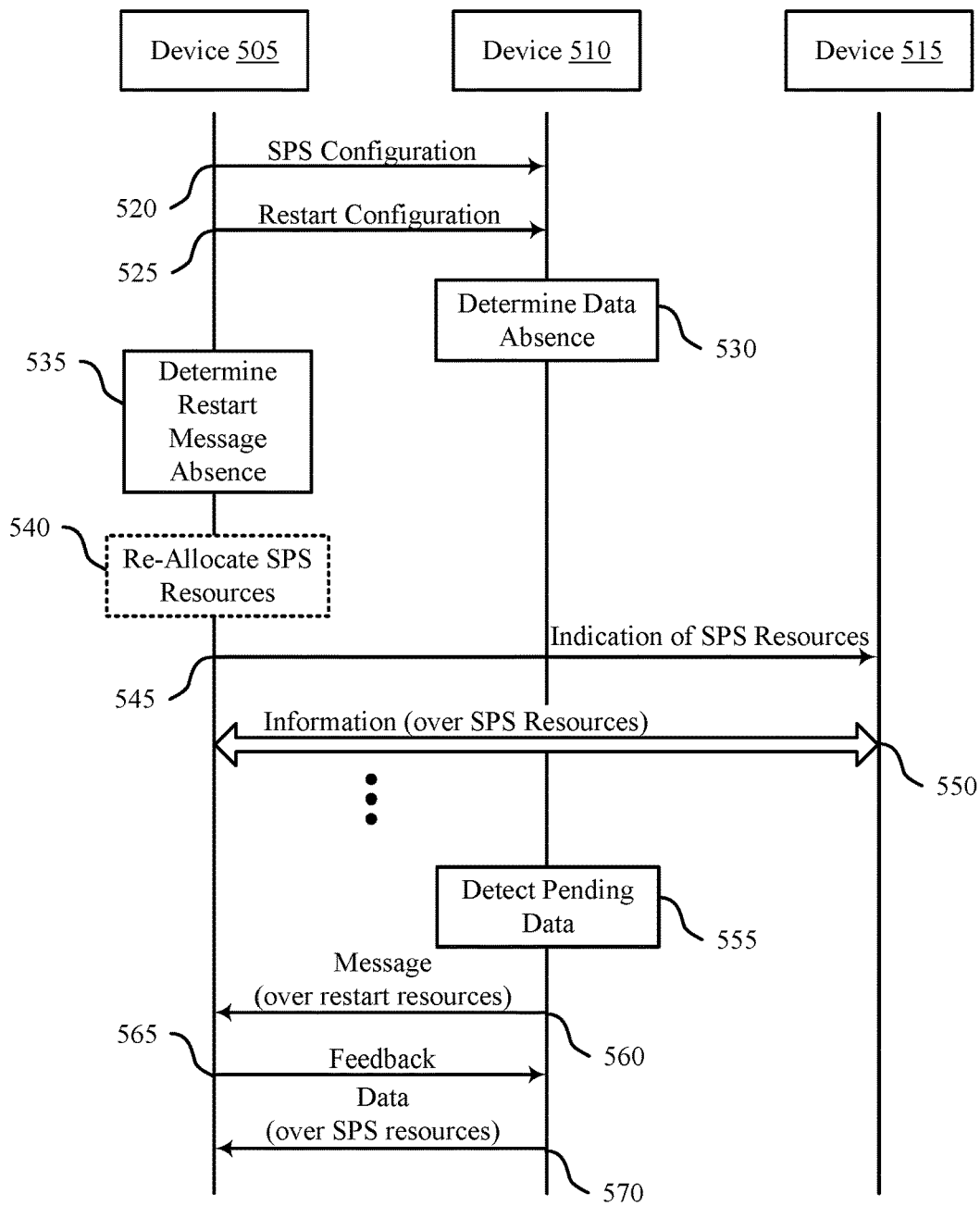
FIG. 5 illustrates an example of a process flow that supports resource configuration for requesting semi-persistently scheduled resources in accordance with aspects of the present disclosure.

FIG. 5 illustrates an example of a process flow 500 that supports resource configuration for requesting semi-persistently scheduled resources in accordance with aspects of the present disclosure. In some examples, process flow 500 may implement aspects of wireless communications system 100 or 200. For example, process flow 500 may be implemented by device 505, device 510, and device 515, which may be examples of a device as described herein. Process flow 500 may be an example of a traffic-driven restart technique for SPS sidelink resources as described herein. Specifically, process flow 500 illustrates an example in which device 505 re-allocates to device 515 a set of SPS resources configured for device 510, thereby ensuring that the set of SPS resource are used.

At 520, device 505 may transmit to device 510 an indication of an SPS configuration for device 450. The indication of the SPS configuration may include values for various SPS parameters, such as the starting time, the frequency, the periodicity, and/or the length (number of slots) of the SPS resources. The indication of the SPS configuration may be conveyed via higher layer signaling (e.g., RRC signaling) or lower layer signaling (e.g., in a DCI or a MAC-CE).

At 525, device 505 may transmit to device 510 an indication of a restart configuration for device 510. The indication of the restart configuration may be conveyed via higher layer signaling (e.g., RRC signaling) or lower layer signaling (e.g., in a DCI or a MAC-CE). The indication of the restart configuration may include values for various restart parameters, such as the time and frequency of restart resources and/or a periodicity of the restart resources. In some examples, the restart configuration may define the set of SPS resources associated with the restart resources. In some examples, the restart configuration may define the type of message device 510 should use as a restart message. For example, the restart message may be a data message, a dummy message (e.g., an all-1 message), or some other type of message. In some examples, the restart configuration may define the type of message device 510 should use to release SPS resources. In some examples, the restart configuration may set the duration of time used for implicit early suspension. After 525, device 505 may monitor the restart resources for a possible restart message from device 510.

At 530, device 510 may determine that it does not have traffic intended for device 505. For example, device 510 may determine that data for device 505 is absent from device 510. Accordingly, device 510 may refrain from transmitting a restart message over a set of the restart resources configured at 525.

At 535, device 505 may determine that a restart message from device 510 is absent from the restart resources configured at 525. Accordingly, at 540, device 505 may re-allocate the set of SPS resources to one or more devices, such as device 515. Device 505 may re-allocate the set of SPS resources for transmissions by device 505 (e.g., to device 415 and/or another device), for transmissions by device 515 (e.g., to device 405, and/or another device), or a combination thereof.

At 545, device 505 may transmit to device 515 an indication of the re-allocated set of SPS resources. In some examples, device 505 may schedule device 515 for communications over the set of SPS resources. If device 505 re-allocated the set of SPS resources for transmissions by device 515, device 505 may, after 570, monitor the set of SPS resources for transmissions from device 515. At 550, device 505 and device 515 may communicate over the re-allocated set of SPS resources. For example, device 515 may transmit, and device 505 may receive, information for device 505 over at least a subset of the set of SPS resources. Device 515 may transmit the information based on the indication of SPS resources received at 545. Additionally or alternatively, device 505 may transmit, and device 515 may receive, information for device 455 over at least a subset of the set SPS resources. In some examples, device 515 may continue to use the set of SPS resources to communicate data to device 505 until device 515 runs out of data for device 505 or until the set of SPS resources ends.

At 555, device 510 may determine that device 510 has traffic intended for device 505. For example, device 510 may detect that device 510 has data pending (e.g., buffered) for device 505. At 560, device 510 may transmit a restart message over a periodic instance of the restart resources indicated at 525. The restart message may request allocation of the set of SPS resources associated with the restart resources. Device 510 may transmit the restart message based on determining that device 510 has traffic intended for device 505. The restart message may be a data message, a dummy message, or another type of message preconfigured by device 505.

At 565, device 505 may transmit feedback for the restart message based on the decoding status of the message. In some examples, the transmission of the feedback message coincides (e.g., temporally, in the time domain) with at least a portion of the restart resources, as described with reference to FIG. 3. In some examples, the feedback for the restart message may serve as a confirmation of restarting the set of SPS resources. After 565, device 505 may monitor the set of SPS resources for data from device 510.

At 570, device 510 may transmit to device 505 data based on receiving the feedback at 565. Device 510 may transmit the data over at least a subset of the set of SPS resources associated with the restart resources used at 560. Device 510 may continue to transmit data over subsets of the set of SPS resources until an early suspension event occurs of the set of SPS resources ends.

Thus, device 505 may prevent SPS resources from going unused, even when device 510 does not initially have data for the device 505. Alternative examples of the foregoing may be implemented, where some operations are performed in a different order than described, are performed in parallel, or are not performed at all. In some cases, operations may include additional features not mentioned below, or further operations may be added. Additionally, certain operations may be performed multiple times or certain combinations of operations may repeat or cycle. The various indications and messages described herein and with reference to process flow 500 may be conveyed via higher layer signaling (e.g., RRC signaling) or lower layer signaling (e.g., in a DCI or a MAC-CE).

Figure 6:
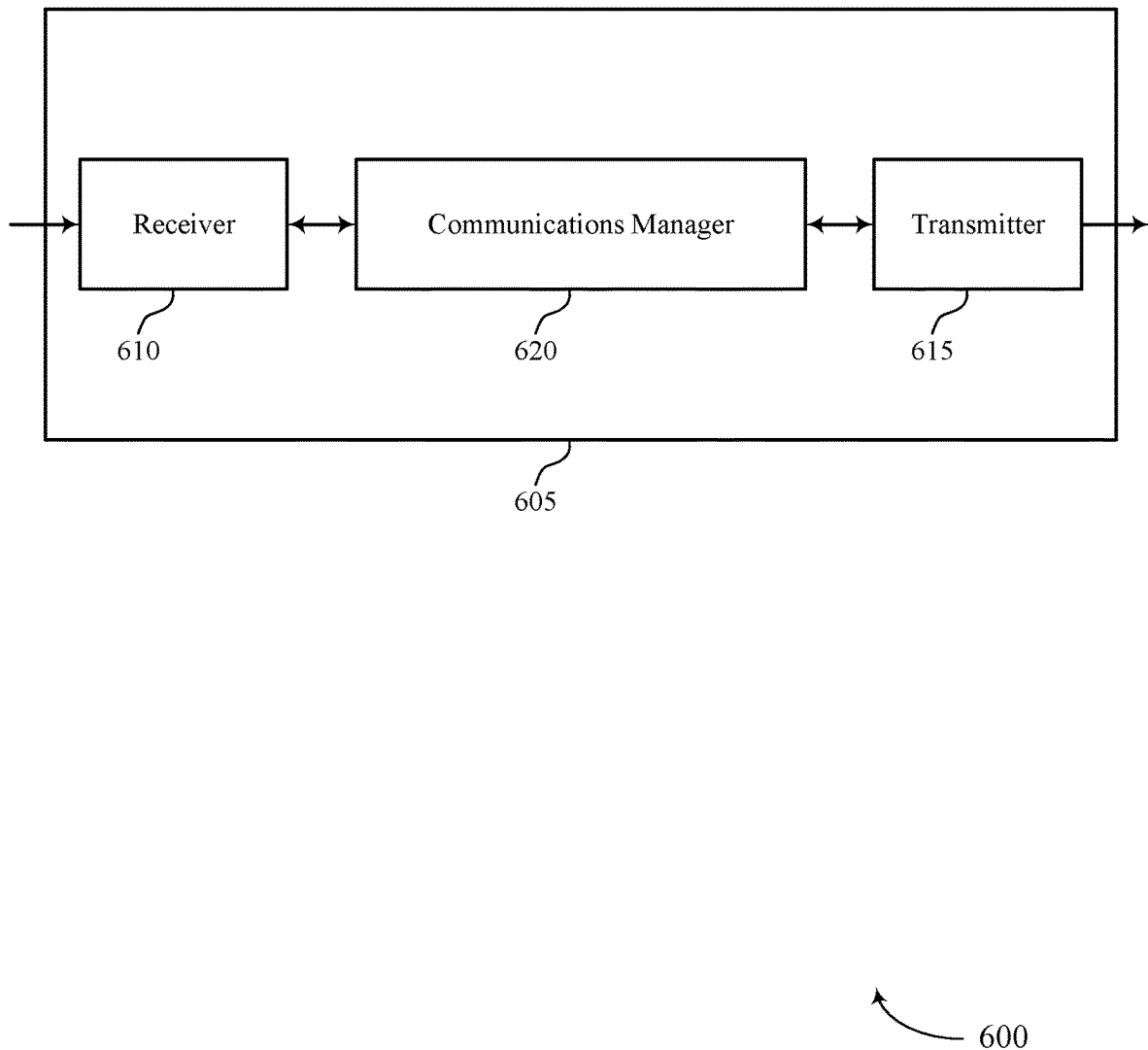
FIGS. 6 and 7 show block diagrams of devices that support resource configuration for requesting semi-persistently scheduled resources in accordance with aspects of the present disclosure.

FIG. 6 shows a block diagram 600 of a device 605 that supports resource configuration for requesting semi-persistently scheduled resources in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to resource configuration for requesting semi-persistently scheduled resources). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to resource configuration for requesting semi-persistently scheduled resources). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of resource configuration for requesting semi-persistently scheduled resources as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a first device in accordance with examples as disclosed herein. For example, the communications manager 620 may be configured as or otherwise support a means for receiving an indication of a configuration that schedules semi-persistently scheduled resources for data transmissions from the first device. The communications manager 620 may be configured as or otherwise support a means for receiving, from a second device, an indication of a set of resources available to the first device for requesting a set of the semi-persistently scheduled resources configured for the first device. The communications manager 620 may be configured as or otherwise support a means for transmitting a message over the set of resources to request the set of semi-persistently scheduled resources.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for efficient utilization of communication resources.

Figure 7:
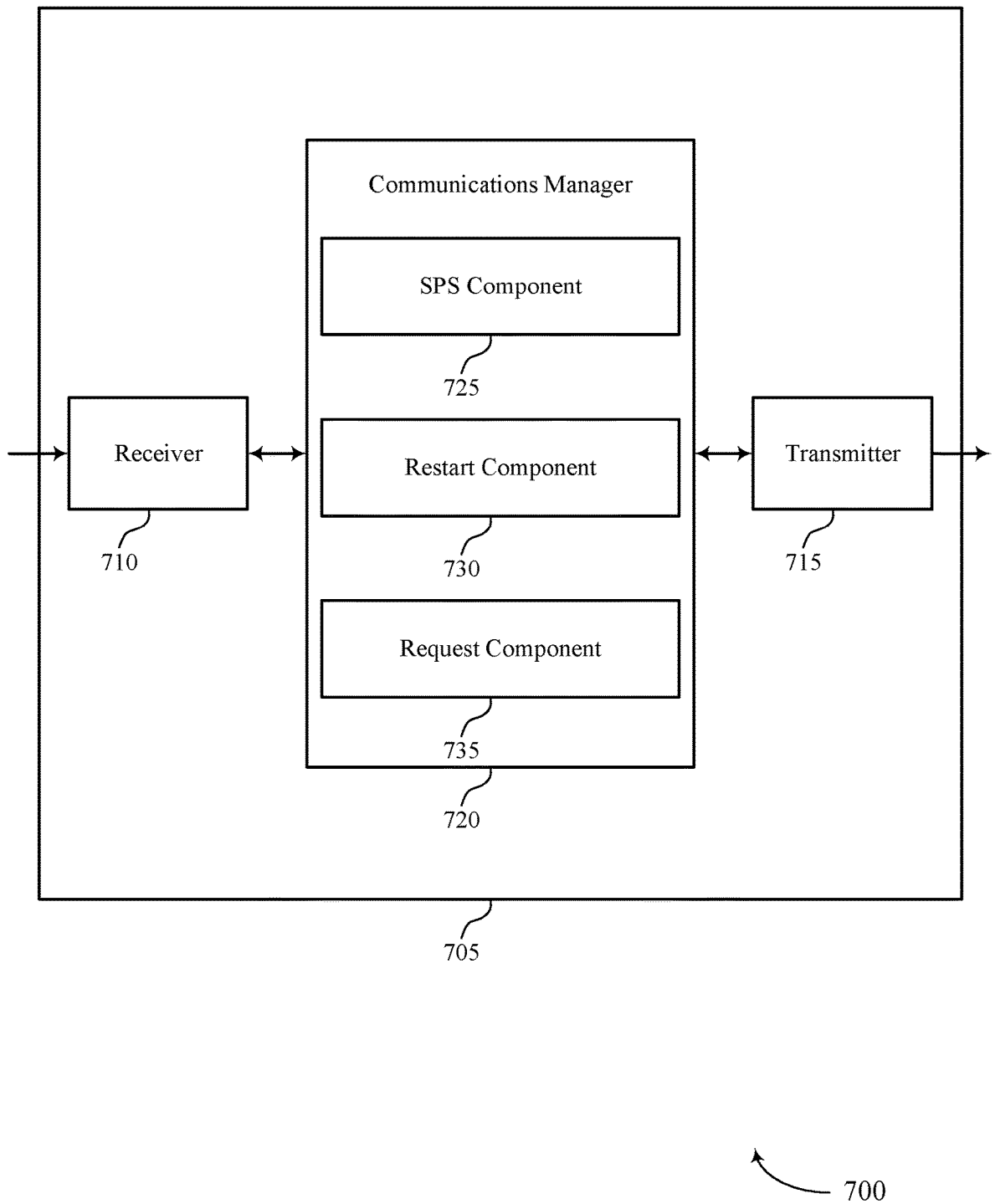

FIG. 7 shows a block diagram 700 of a device 705 that supports resource configuration for requesting semi-persistently scheduled resources in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to resource configuration for requesting semi-persistently scheduled resources). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to resource configuration for requesting semi-persistently scheduled resources). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of resource configuration for requesting semi-persistently scheduled resources as described herein. For example, the communications manager 720 may include an SPS component 725, a restart component 730, a request component 735, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a first device in accordance with examples as disclosed herein. The SPS component 725 may be configured as or otherwise support a means for receiving an indication of a configuration that schedules semi-persistently scheduled resources for data transmissions from the first device. The restart component 730 may be configured as or otherwise support a means for receiving, from a second device, an indication of a set of resources available to the first device for requesting a set of the semi-persistently scheduled resources configured for the first device. The request component 735 may be configured as or otherwise support a means for transmitting a message over the set of resources to request the set of semi-persistently scheduled resources.

Figure 8:
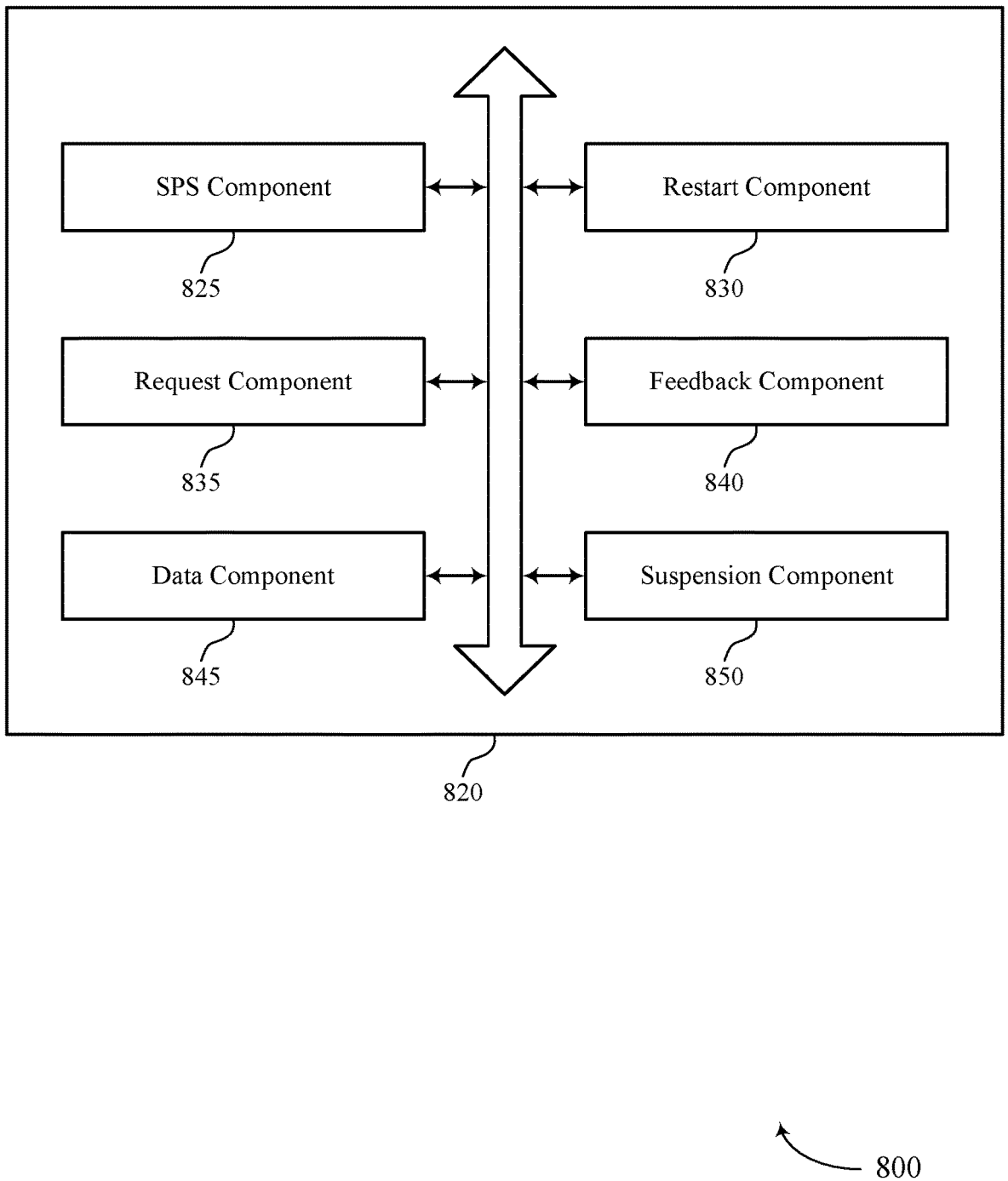
FIG. 8 shows a block diagram of a communications manager that supports resource configuration for requesting semi-persistently scheduled resources in accordance with aspects of the present disclosure.

FIG. 8 shows a block diagram 800 of a communications manager 820 that supports resource configuration for requesting semi-persistently scheduled resources in accordance with aspects of the present disclosure. The communications manager 820 may be an example of aspects of a communications manager 620, a communications manager 720, or both, as described herein. The communications manager 820, or various components thereof, may be an example of means for performing various aspects of resource configuration for requesting semi-persistently scheduled resources as described herein. For example, the communications manager 820 may include an SPS component 825, a restart component 830, a request component 835, a feedback component 840, a data component 845, a suspension component 850, or any combination thereof. Each of these components may communicate, directly or indirectly, with one another (e.g., via one or more buses).

The communications manager 820 may support wireless communication at a first device in accordance with examples as disclosed herein. The SPS component 825 may be configured as or otherwise support a means for receiving an indication of a configuration that schedules semi-persistently scheduled resources for data transmissions from the first device. The restart component 830 may be configured as or otherwise support a means for receiving, from a second device, an indication of a set of resources available to the first device for requesting a set of the semi-persistently scheduled resources configured for the first device. The request component 835 may be configured as or otherwise support a means for transmitting a message over the set of resources to request the set of semi-persistently scheduled resources.

In some examples, the feedback component 840 may be configured as or otherwise support a means for receiving, from the second device, a message indicating feedback responsive to the message that requests the set of semi-persistently scheduled resources. In some examples, the data component 845 may be configured as or otherwise support a means for transmitting data over at least a subset of the set of semi-persistently scheduled resources based on receiving the message indicating the feedback.

In some examples, the feedback component 840 may be configured as or otherwise support a means for determining that a message indicating feedback responsive to the message that requests the set of semi-persistently scheduled resources has not been received within a threshold duration of time. In some examples, the data component 845 may be configured as or otherwise support a means for refraining from transmitting data over the set of semi-persistently scheduled resources based on the determination.

In some examples, the data component 845 may be configured as or otherwise support a means for transmitting data in a first subset of the set of semi-persistently scheduled resources based on transmitting the message that requests the set of semi-persistently scheduled resources. In some examples, the suspension component 850 may be configured as or otherwise support a means for transmitting a second message indicating that a second subset of the set of semi-persistently scheduled resources will not be used by the first device.

In some examples, the second message is transmitted over a third subset of the set of semi-persistently scheduled resources. In some examples, the set of semi-persistently scheduled resources includes the set of resources for requesting the set of the semi-persistently scheduled resources.

In some examples, the restart component 830 may be configured as or otherwise support a means for receiving a message indicating a type of message for transmission over the set of resources to request the set of the semi-persistently scheduled resources. In some examples, the set of semi-persistently scheduled resources is associated with the set of resources.

In some examples, the set of semi-persistently scheduled resources includes a quantity of consecutive instances of semi-persistently scheduled resources, and the SPS component 825 may be configured as or otherwise support a means for receiving a message indicating the quantity of consecutive instances or a duration of time that includes the quantity of consecutive instances.

In some examples, the restart component 830 may be configured as or otherwise support a means for receiving a message indicating a periodicity associated with the set of resources, where the message that requests the set of semi-persistently scheduled resources is transmitted based on the periodicity.

In some examples, the data component 845 may be configured as or otherwise support a means for determining that the first device has data for the second device, where the message that requests the set of semi-persistently scheduled resources is transmitted based on the determination.

Figure 9:
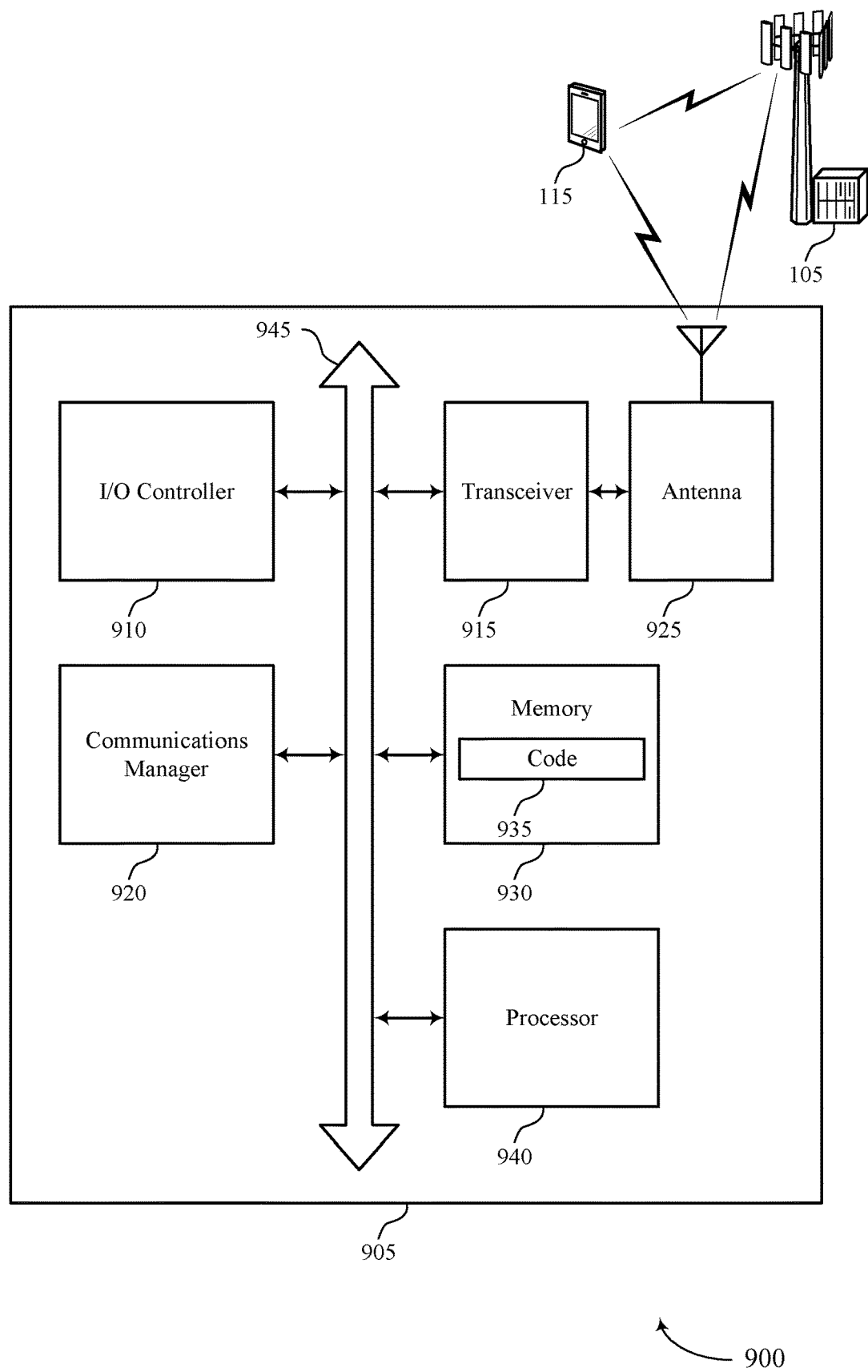
FIG. 9 shows a diagram of a system including a device that supports resource configuration for requesting semi-persistently scheduled resources in accordance with aspects of the present disclosure.

FIG. 9 shows a diagram of a system 900 including a device 905 that supports resource configuration for requesting semi-persistently scheduled resources in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting resource configuration for requesting semi-persistently scheduled resources). For example, the device 905 or a component of the device 905 may include a processor 940 and memory 930 coupled to the processor 940, the processor 940 and memory 930 configured to perform various functions described herein.

The communications manager 920 may support wireless communication at a first device in accordance with examples as disclosed herein. For example, the communications manager 920 may be configured as or otherwise support a means for receiving an indication of a configuration that schedules semi-persistently scheduled resources for data transmissions from the first device. The communications manager 920 may be configured as or otherwise support a means for receiving, from a second device, an indication of a set of resources available to the first device for requesting a set of the semi-persistently scheduled resources configured for the first device. The communications manager 920 may be configured as or otherwise support a means for transmitting a message over the set of resources to request the set of semi-persistently scheduled resources.

By including or configuring the communications manager 920 in accordance with examples as described herein, the device 905 may support techniques for more efficient utilization of communication resources.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of resource configuration for requesting semi-persistently scheduled resources as described herein, or the processor 940 and the memory 930 may be otherwise configured to perform or support such operations.

Figure 10:
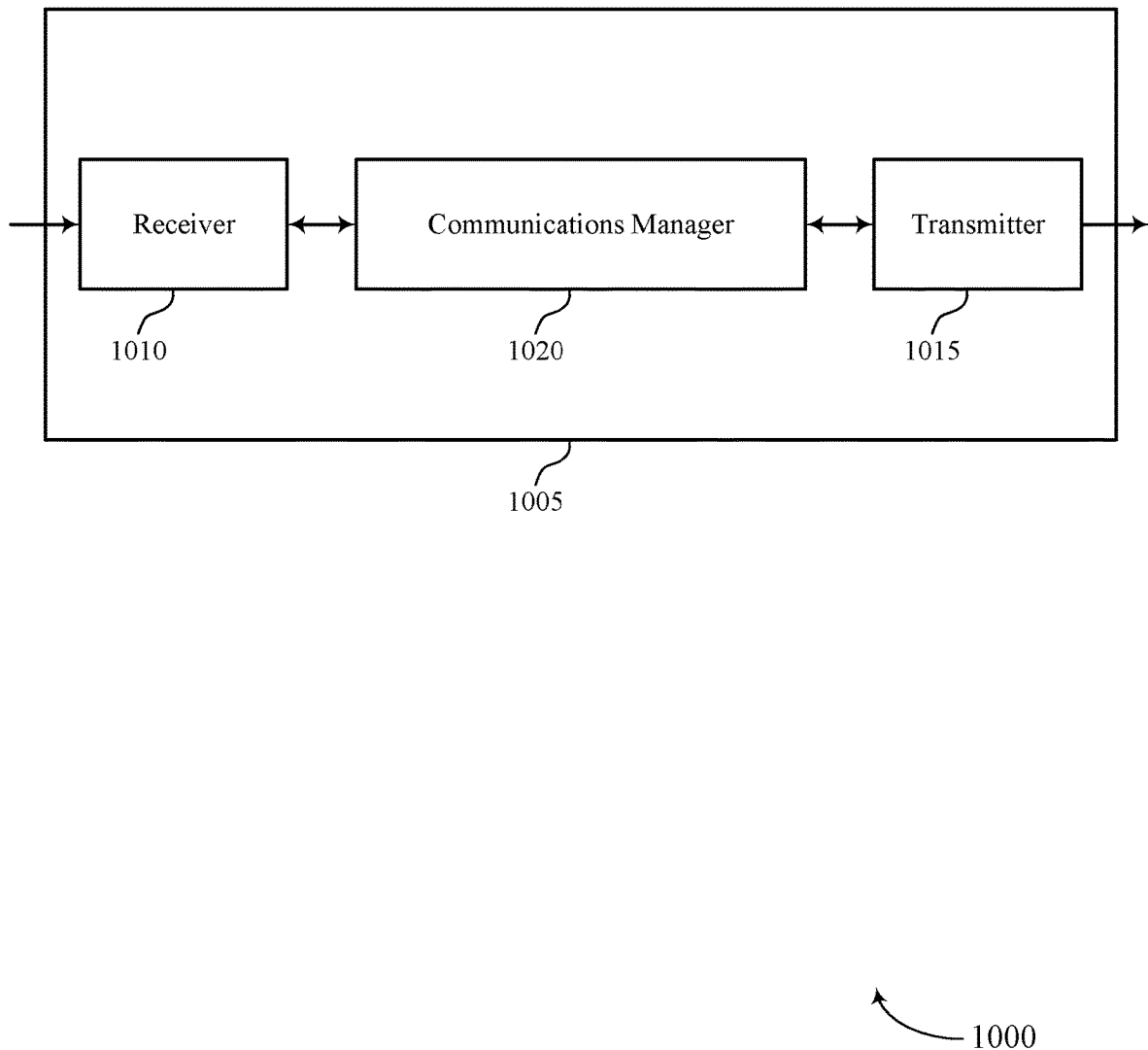
FIGS. 10 and 11 show block diagrams of devices that support resource configuration for requesting semi-persistently scheduled resources in accordance with aspects of the present disclosure.

FIG. 10 shows a block diagram 1000 of a device 1005 that supports resource configuration for requesting semi-persistently scheduled resources in accordance with aspects of the present disclosure. The device 1005 may be an example of aspects of a base station, UE, or device as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to resource configuration for requesting semi-persistently scheduled resources). Information may be passed on to other components of the device 1005. The receiver 1010 may utilize a single antenna or a set of multiple antennas.

The transmitter 1015 may provide a means for transmitting signals generated by other components of the device

1005. For example, the transmitter 1015 may transmit information such as packets, user data, control information, or any combination thereof associated with various information channels (e.g., control channels, data channels, information channels related to resource configuration for requesting semi-persistently scheduled resources). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of resource configuration for requesting semi-persistently scheduled resources as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a first device in accordance with examples as disclosed herein. For example, the communications manager 1020 may be configured as or otherwise support a means for configuring semi-persistently scheduled resources for a second device. The communications manager 1020 may be configured as or otherwise support a means for transmitting an indication of a set of resources available to the second device for requesting a set of the semi-persistently scheduled resources configured for the second device. The communications manager 1020 may be configured as or otherwise support a means for communicating data over at least a subset of the set of semi-persistently scheduled resources configured for the second device based on transmitting the indication of the set of resources.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for more efficient utilization of communication resources.

Figure 11:
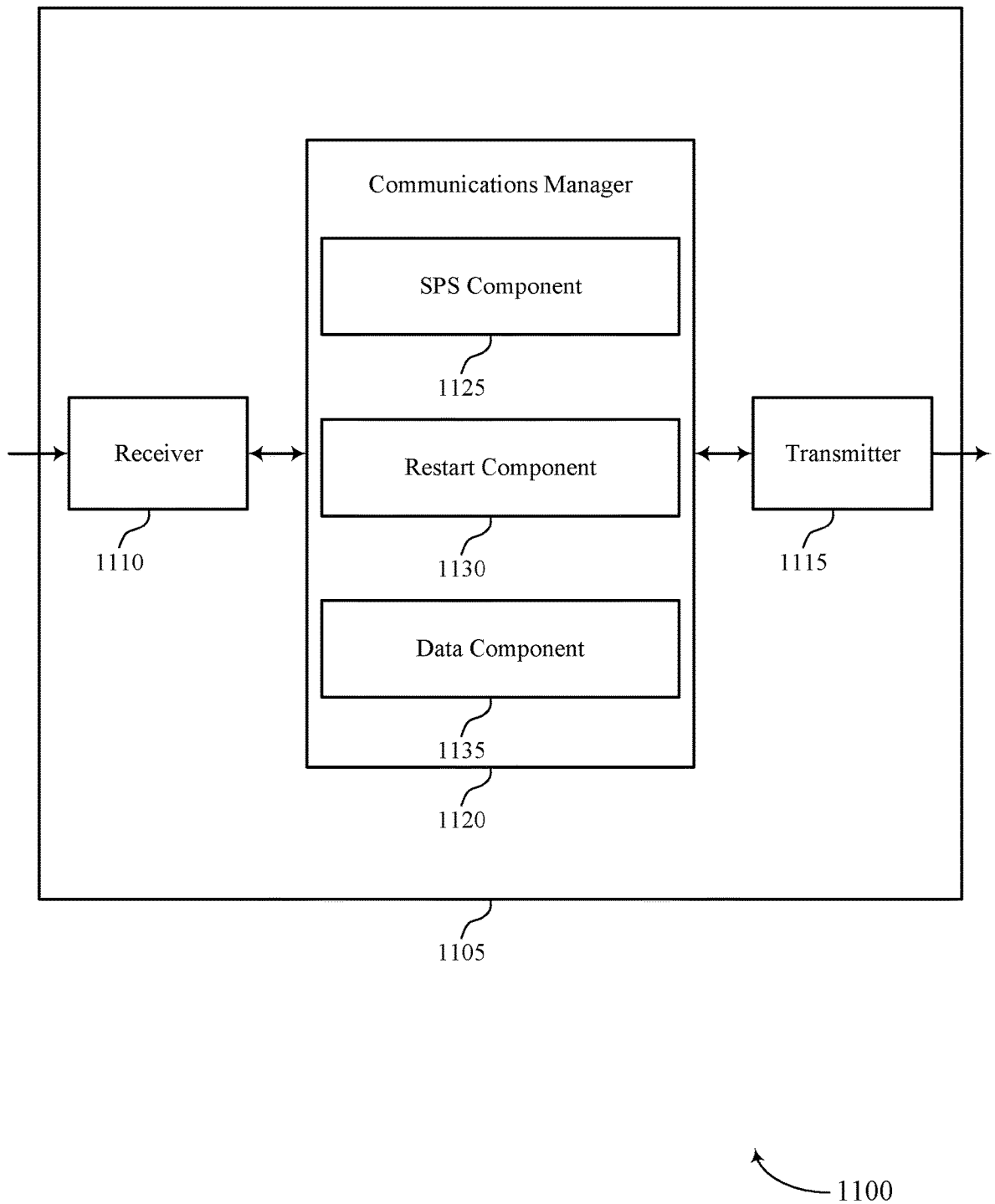

FIG. 11 shows a block diagram 1100 of a device 1105 that supports resource configuration for requesting semi-persistently scheduled resources in accordance with aspects of the present disclosure. The device 1105 may be an example of aspects of a device 1005, a UE, or a base station as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to resource configuration for requesting semi-persistently scheduled resources). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to resource configuration for requesting semi-persistently scheduled resources). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of resource configuration for requesting semi-persistently scheduled resources as described herein. For example, the communications manager 1120 may include an SPS component 1125, a restart component 1130, a data component 1135, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a first device in accordance with examples as disclosed herein. The SPS component 1125 may be configured as or otherwise support a means for configuring semi-persistently scheduled resources for a second device. The restart component 1130 may be configured as or otherwise support a means for transmitting an indication of a set of resources available to the second device for requesting a set of the semi-persistently scheduled resources configured for the second device. The data component 1135 may be configured as or otherwise support a means for communicating data over at least a subset of the set of semi-persistently scheduled resources configured for the second device based on transmitting the indication of the set of resources.

Figure 12:
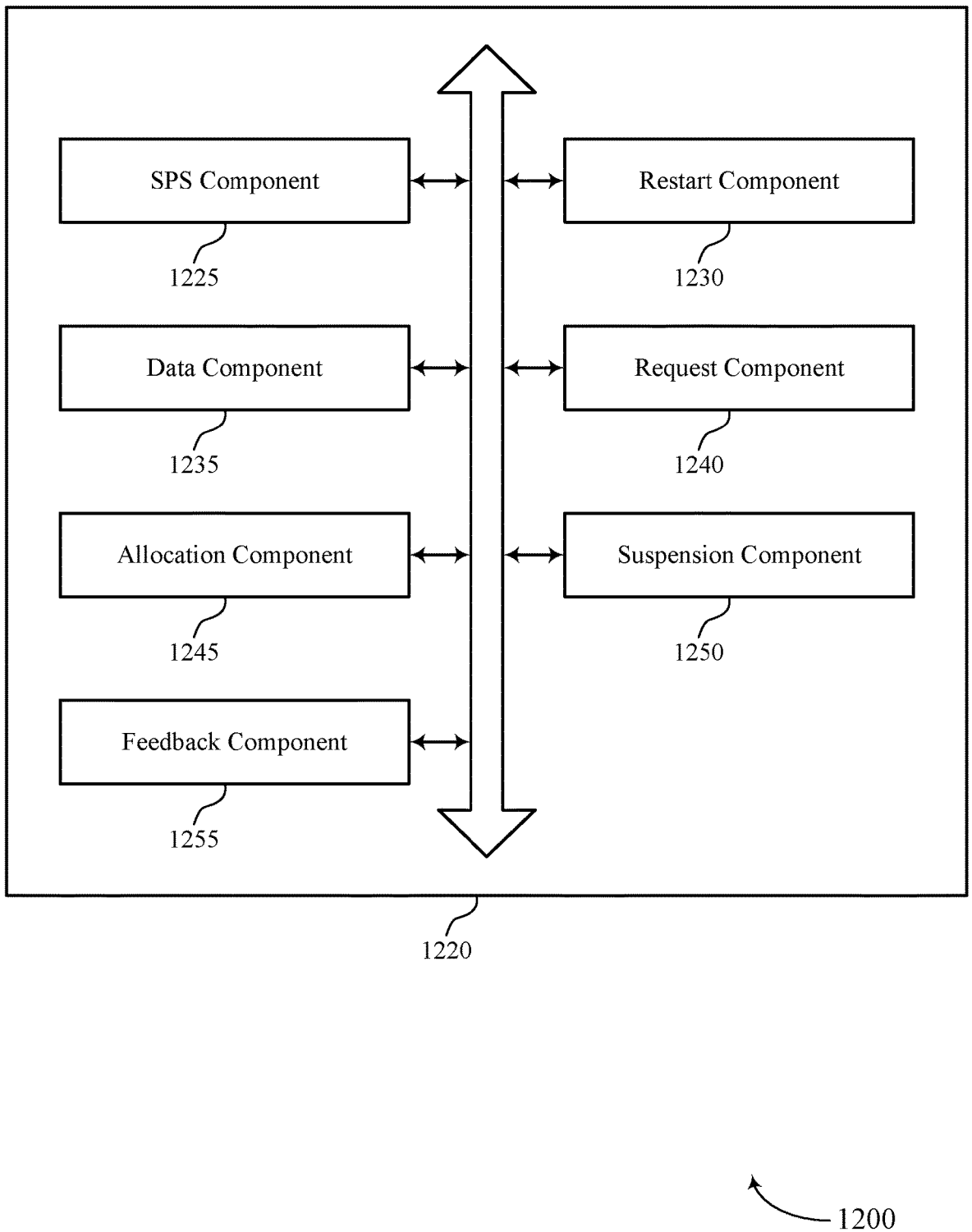
FIG. 12 shows a block diagram of a communications manager that supports resource configuration for requesting semi-persistently scheduled resources in accordance with aspects of the present disclosure.

FIG. 12 shows a block diagram 1200 of a communications manager 1220 that supports resource configuration for requesting semi-persistently scheduled resources in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of resource configuration for requesting semi-persistently scheduled resources as described herein. For example, the communications manager 1220 may include an SPS component 1225, a restart component 1230, a data component 1235, a request component 1240, an allocation component 1245, a suspension component 1250, a feedback component 1255, or any combination thereof. Each of these components may communicate, directly or indirectly, with one another (e.g., via one or more buses).

The communications manager 1220 may support wireless communication at a first device in accordance with examples as disclosed herein. The SPS component 1225 may be configured as or otherwise support a means for configuring semi-persistently scheduled resources for a second device. The restart component 1230 may be configured as or otherwise support a means for transmitting an indication of a set of resources available to the second device for requesting a set of the semi-persistently scheduled resources configured for the second device. The data component 1235 may be configured as or otherwise support a means for communicating data over at least a subset of the set of semi-persistently scheduled resources configured for the second device based on transmitting the indication of the set of resources.

In some examples, the request component 1240 may be configured as or otherwise support a means for receiving a message over the set of resources for requesting the set of semi-persistently scheduled resources, where the data is received from the second device after the message is received.

In some examples, the feedback component 1255 may be configured as or otherwise support a means for transmitting, to the second device, a message indicating feedback responsive to the message for requesting the set of semi-persistently scheduled resources, where the data is received based on transmitting the message indicating the feedback.

In some examples, the request component 1240 may be configured as or otherwise support a means for determining that the second device has not transmitted a message over the set of resources for requesting the set of semi-persistently scheduled resources. In some examples, the allocation component 1245 may be configured as or otherwise support a means for re-allocating the semi-persistently scheduled resources to a third device.

In some examples, the data is received from the second device, and the suspension component 1250 may be configured as or otherwise support a means for receiving from the second device a second message indicating that a second subset of the set of semi-persistently scheduled resources will not be used by the second device. In some examples, the data is received from the second device, and the allocation component 1245 may be configured as or otherwise support a means for re-allocating the second subset of the set of semi-persistently scheduled resources to a third device based on receiving the second message.

In some examples, the data is received from the second device, and the suspension component 1250 may be configured as or otherwise support a means for determining that a threshold duration of time has elapsed since receipt of the data. In some examples, the data is received from the second device, and the allocation component 1245 may be configured as or otherwise support a means for re-allocating a second subset of the set of semi-persistently scheduled resources to a third device based on the determination.

In some examples, the restart component 1230 may be configured as or otherwise support a means for transmitting a message indicating a type of message the second device is to transmit over the set of resources to request the set of the semi-persistently scheduled resources.

In some examples, the set of semi-persistently scheduled resources is associated with the set of resources.

In some examples, the set of semi-persistently scheduled resources includes a quantity of consecutive instances of semi-persistently scheduled resources, and the SPS component 1225 may be configured as or otherwise support a means for transmitting a message indicating the quantity of consecutive instances or a duration of time that includes the quantity of consecutive instances.

In some examples, the set of semi-persistently scheduled resources includes the set of resources for requesting the set of the semi-persistently scheduled resources.

In some examples, the restart component 1230 may be configured as or otherwise support a means for transmitting a message indicating a periodicity associated with the set of resources, where the message for requesting the set of semi-persistently scheduled resources is received based on the periodicity.

Figure 13:
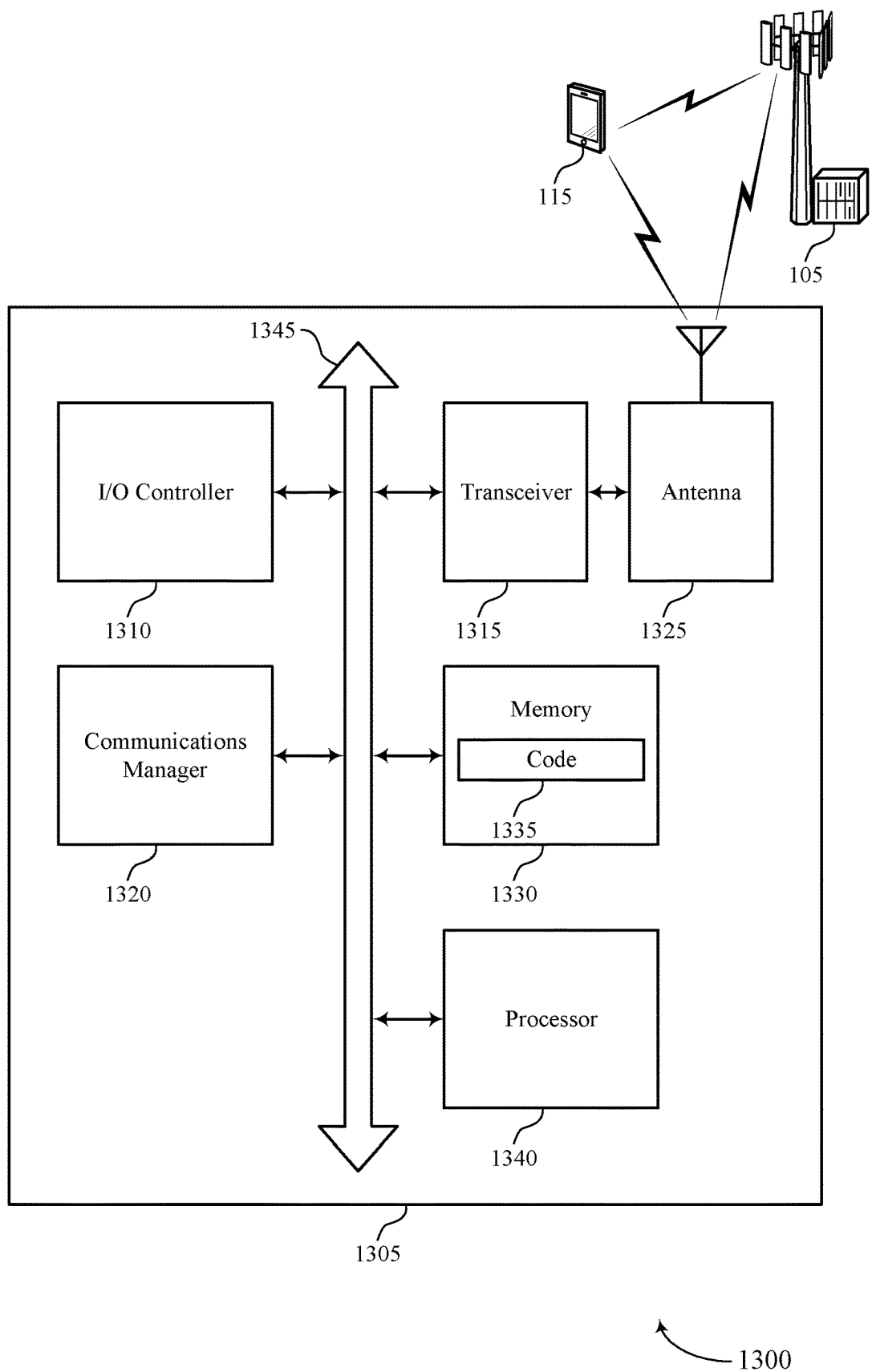
FIG. 13 shows a diagram of a system including a device that supports resource configuration for requesting semi-persistently scheduled resources in accordance with aspects of the present disclosure.

FIG. 13 shows a diagram of a system 1300 including a device 1305 that supports resource configuration for requesting semi-persistently scheduled resources in accordance with aspects of the present disclosure. The device 1305 may be an example of or include the components of a device 1005, a device 1105, a UE, a base station as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, an I/O controller 1310, a transceiver 1315, an antenna 1325, a memory 1330, code 1335, and a processor 1340. These components may be in electronic communication or otherwise coupled (e.g., operatively, communicatively, functionally, electronically, electrically) via one or more buses (e.g., a bus 1345).

The I/O controller 1310 may manage input and output signals for the device 1305. The I/O controller 1310 may also manage peripherals not integrated into the device 905. In some cases, the I/O controller 1310 may represent a physical connection or port to an external peripheral. In some cases, the I/O controller 1310 may utilize an operating system such as iOS®, ANDROID®, MS-DOS®, MS-WINDOWS®, OS/2®, UNIX®, LINUX®, or another known operating system. Additionally or alternatively, the I/O controller 1310 may represent or interact with a modem, a keyboard, a mouse, a touchscreen, or a similar device. In some cases, the I/O controller 1310 may be implemented as part of a processor, such as the processor 1340. In some cases, a user may interact with the device 1305 via the I/O controller 1310 or via hardware components controlled by the I/O controller 1310.

In some cases, the device 1305 may include a single antenna 1325. However, in some other cases, the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 101515, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting resource configuration for requesting semi-persistently scheduled resources). For example, the device 1305 or a component of the device 1305 may include a processor 1340 and memory 1330 coupled to the processor 1340, the processor 1340 and memory 1330 configured to perform various functions described herein.

The communications manager 1320 may support wireless communication at a first device in accordance with examples as disclosed herein. For example, the communications manager 1320 may be configured as or otherwise support a means for configuring semi-persistently scheduled resources for a second device. The communications manager 1320 may be configured as or otherwise support a means for transmitting an indication of a set of resources available to the second device for requesting a set of the semi-persistently scheduled resources configured for the second device. The communications manager 1320 may be configured as or otherwise support a means for communicating data over at least a subset of the set of semi-persistently scheduled resources configured for the second device based on transmitting the indication of the set of resources.

By including or configuring the communications manager 1320 in accordance with examples as described herein, the device 1305 may support techniques for more efficient utilization of communication resources.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of resource configuration for requesting semi-persistently scheduled resources as described herein, or the processor 1340 and the memory 1330 may be otherwise configured to perform or support such operations.

Figure 14:
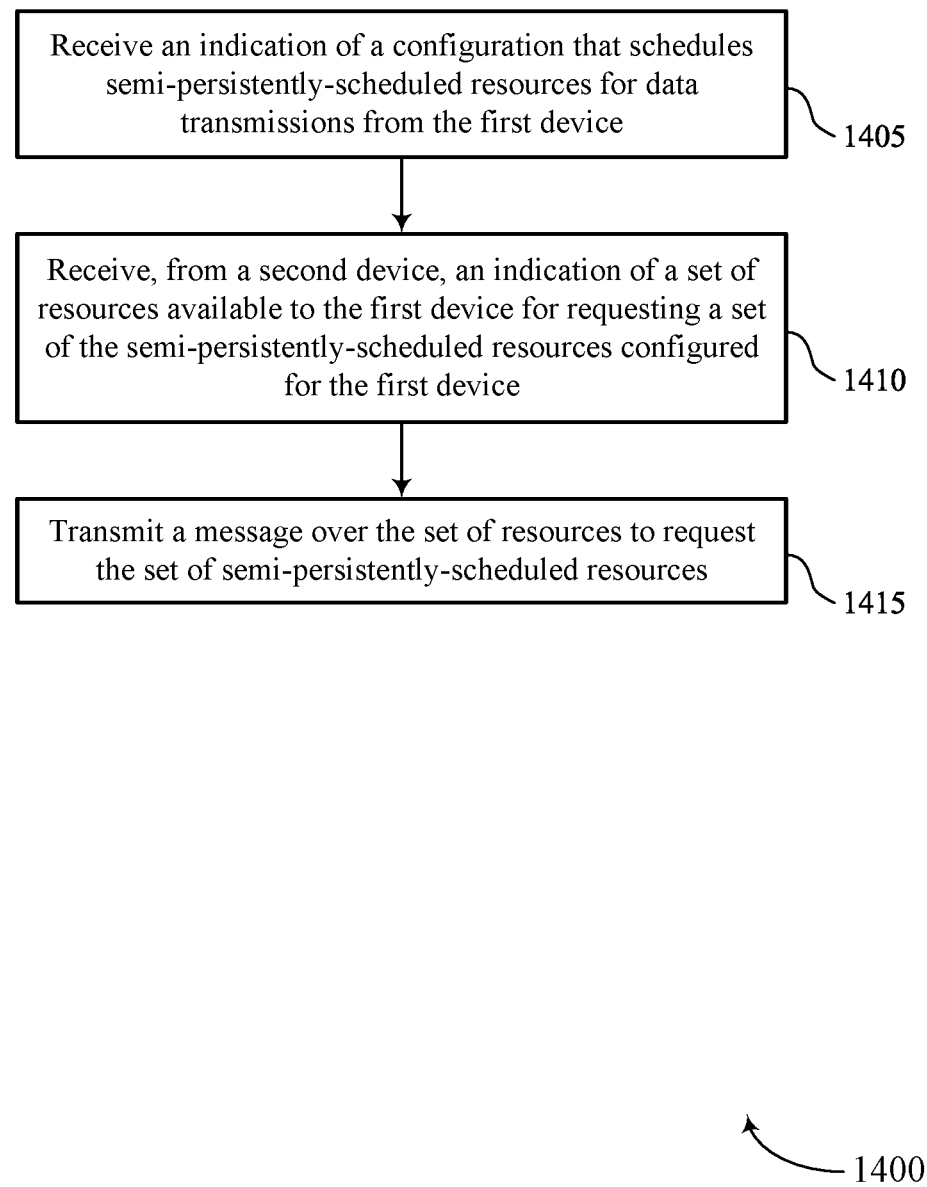
FIGS. 14 and 15 show flowcharts illustrating methods that support resource configuration for requesting semi-persistently scheduled resources in accordance with aspects of the present disclosure.

FIG. 14 shows a flowchart illustrating a method 1400 that supports resource configuration for requesting semi-persistently scheduled resources in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include receiving an indication of a configuration that schedules semi-persistently scheduled resources for data transmissions from the first device. The operations of 1405 may be performed in accordance with examples as disclosed herein. In some examples, aspects of the operations of 1405 may be performed by an SPS component 825 as described with reference to FIG. 8.

At 1410, the method may include receiving, from a second device, an indication of a set of resources available to the first device for requesting a set of the semi-persistently scheduled resources configured for the first device. The operations of 1410 may be performed in accordance with examples as disclosed herein. In some examples, aspects of the operations of 1410 may be performed by a restart component 830 as described with reference to FIG. 8.

At 1415, the method may include transmitting a message over the set of resources to request the set of semi-persistently scheduled resources. The operations of 1415 may be performed in accordance with examples as disclosed herein. In some examples, aspects of the operations of 1415 may be performed by a request component 835 as described with reference to FIG. 8.

Figure 15:
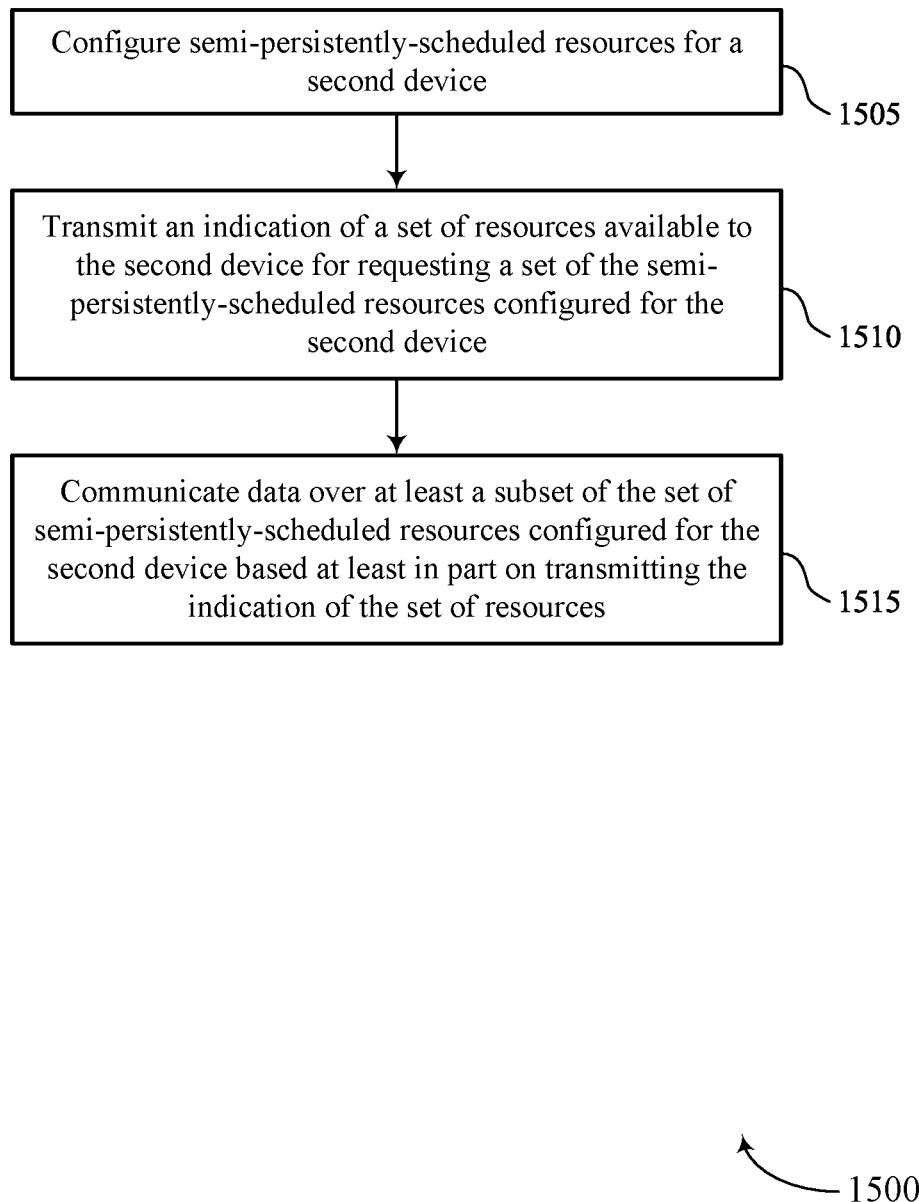

FIG. 15 shows a flowchart illustrating a method 1500 that supports resource configuration for requesting semi-persistently scheduled resources in accordance with aspects of the present disclosure. The operations of the method 1500 may be implemented by a UE or a base station or its components as described herein. For example, the operations of the method 1500 may be performed by a UE 115 or a base station 105 as described with reference to FIGS. 1 through 5 and 10 through 13. In some examples, the operations of the method 1500 may be performed by a PLC. In some examples, a base station or a UE may execute a set of instructions to control the functional elements of the base station or the UE to perform the described functions. Additionally or alternatively, the base station or the UE may perform aspects of the described functions using special-purpose hardware.

At 1505, the method may include configuring semi-persistently scheduled resources for a second device. The operations of 1505 may be performed in accordance with examples as disclosed herein. In some examples, aspects of the operations of 1505 may be performed by an SPS component 1225 as described with reference to FIG. 12.

At 1510, the method may include transmitting an indication of a set of resources available to the second device for requesting a set of the semi-persistently scheduled resources configured for the second device. The operations of 1510 may be performed in accordance with examples as disclosed herein. In some examples, aspects of the operations of 1510 may be performed by a restart component 1230 as described with reference to FIG. 12.

At 1515, the method may include communicating data over at least a subset of the set of semi-persistently scheduled resources configured for the second device based on transmitting the indication of the set of resources. The operations of 1515 may be performed in accordance with examples as disclosed herein. In some examples, aspects of the operations of 1515 may be performed by a data component 1235 as described with reference to FIG. 12.

The following provides an overview of aspects of the present disclosure:

Aspect 1: A method for wireless communication at a first device, comprising: receiving an indication of a configuration that schedules semi-persistently-scheduled resources for data transmissions from the first device; receiving, from a second device, an indication of a set of resources available to the first device for requesting a set of the semi-persistently-scheduled resources configured for the first device; and transmitting a message over the set of resources to request the set of semi-persistently-scheduled resources.

Aspect 2: The method of aspect 1, further comprising: receiving, from the second device, a message indicating feedback responsive to the message that requests the set of semi-persistently-scheduled resources; and transmitting data over at least a subset of the set of semi-persistently-scheduled resources based at least in part on receiving the message indicating the feedback.

Aspect 3: The method of aspect 1, further comprising: determining that a message indicating feedback responsive to the message that requests the set of semi-persistently-scheduled resources has not been received within a threshold duration of time; and refraining from transmitting data over the set of semi-persistently-scheduled resources based at least in part on the determination.

Aspect 4: The method of any of aspects 1 through 2, further comprising: transmitting data in a first subset of the set of semi-persistently-scheduled resources based at least in part on transmitting the message that requests the set of semi-persistently-scheduled resources; and transmitting a second message indicating that a second subset of the set of semi-persistently-scheduled resources will not be used by the first device.

Aspect 5: The method of aspect 4, wherein the second message is transmitted over a third subset of the set of semi-persistently-scheduled resources.

Aspect 6: The method of any of aspects 1 through 5, wherein the set of semi-persistently-scheduled resources comprises the set of resources for requesting the set of the semi-persistently-scheduled resources.

Aspect 7: The method of any of aspects 1 through 6, further comprising: receiving a message indicating a type of message for transmission over the set of resources to request the set of the semi-persistently-scheduled resources.

Aspect 8: The method of any of aspects 1 through 7, wherein the set of semi-persistently-scheduled resources is associated with the set of resources.

Aspect 9: The method of any of aspects 1 through 8, wherein the set of semi-persistently-scheduled resources comprises a quantity of consecutive instances of semi-persistently-scheduled resources, the method further comprising: receiving a message indicating the quantity of consecutive instances or a duration of time that includes the quantity of consecutive instances.

Aspect 10: The method of any of aspects 1 through 9, further comprising: receiving a message indicating a periodicity associated with the set of resources, wherein the message that requests the set of semi-persistently-scheduled resources is transmitted based at least in part on the periodicity.

Aspect 11: The method of any of aspects 1 through 10, further comprising: determining that the first device has data for the second device, wherein the message that requests the set of semi-persistently-scheduled resources is transmitted based at least in part on the determination.

Aspect 12: A method for wireless communication at a first device, comprising: configuring semi-persistently-scheduled resources for a second device; transmitting an indication of a set of resources available to the second device for requesting a set of the semi-persistently-scheduled resources configured for the second device; and communicating data over at least a subset of the set of semi-persistently-scheduled resources configured for the second device based at least in part on transmitting the indication of the set of resources.

Aspect 13: The method of aspect 12, further comprising: receiving a message over the set of resources for requesting the set of semi-persistently-scheduled resources, wherein the data is received from the second device after the message is received.

Aspect 14: The method of aspect 13, further comprising: transmitting, to the second device, a message indicating feedback responsive to the message for requesting the set of semi-persistently-scheduled resources, wherein the data is received based at least in part on transmitting the message indicating the feedback.

Aspect 15: The method of aspect 12, further comprising: determining that the second device has not transmitted a message over the set of resources for requesting the set of semi-persistently-scheduled resources; and re-allocating the semi-persistently-scheduled resources to a third device.

Aspect 16: The method of any of aspects 12 through 14, wherein the data is received from the second device, the method further comprising: receiving from the second device a second message indicating that a second subset of the set of semi-persistently-scheduled resources will not be used by the second device; and re-allocating the second subset of the set of semi-persistently-scheduled resources to a third device based at least in part on receiving the second message.

Aspect 17: The method of any of aspects 12 through 14, wherein the data is received from the second device, the method further comprising: determining that a threshold duration of time has elapsed since receipt of the data; and re-allocating a second subset of the set of semi-persistently-scheduled resources to a third device based at least in part on the determination.

Aspect 18: The method of any of aspects 12 through 17, further comprising: transmitting a message indicating a type of message the second device is to transmit over the set of resources to request the set of the semi-persistently-scheduled resources.

Aspect 19: The method of any of aspects 12 through 18, wherein the set of semi-persistently-scheduled resources is associated with the set of resources.

Aspect 20: The method of any of aspects 12 through 19, wherein the set of semi-persistently-scheduled resources comprises a quantity of consecutive instances of semi-persistently-scheduled resources, the method further comprising: transmitting a message indicating the quantity of consecutive instances or a duration of time that includes the quantity of consecutive instances.

Aspect 21: The method of any of aspects 12 through 20, wherein the set of semi-persistently-scheduled resources comprises the set of resources for requesting the set of the semi-persistently-scheduled resources.

Aspect 22: The method of any of aspects 12 through 21, further comprising: transmitting a message indicating a periodicity associated with the set of resources, wherein the message for requesting the set of semi-persistently-scheduled resources is received based at least in part on the periodicity.

Aspect 23: An apparatus for wireless communication at a first device, comprising a processor; memory coupled with the processor; and instructions stored in the memory and executable by the processor to cause the apparatus to perform a method of any of aspects 1 through 11.

Aspect 24: An apparatus for wireless communication at a first device, comprising at least one means for performing a method of any of aspects 1 through 11.

Aspect 25: A non-transitory computer-readable medium storing code for wireless communication at a first device, the code comprising instructions executable by a processor to perform a method of any of aspects 1 through 11.

Aspect 26: An apparatus for wireless communication at a first device, comprising a processor; memory coupled with the processor; and instructions stored in the memory and executable by the processor to cause the apparatus to perform a method of any of aspects 12 through 22.

Aspect 27: An apparatus for wireless communication at a first device, comprising at least one means for performing a method of any of aspects 12 through 22.

Aspect 28: A non-transitory computer-readable medium storing code for wireless communication at a first device, the code comprising instructions executable by a processor to perform a method of any of aspects 12 through 22.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first device, comprising:
   receiving an indication of a configuration that schedules semi-persistently scheduled resources for data transmissions from the first device;
   receiving, from a second device, an indication of a set of resources available to the first device for requesting a set of the semi-persistently scheduled resources configured for the first device, wherein the set of resources available to the first device are in an instance of the set of the semi-persistently scheduled resources; and
   transmitting a message over the set of resources available to the first device to request the set of the semi-persistently scheduled resources.

2. The method of claim 1, further comprising:
   receiving, from the second device, a message indicating feedback responsive to the message that requests the set of the semi-persistently scheduled resources; and
   transmitting data over at least a subset of the set of the semi-persistently scheduled resources based at least in part on receiving the message indicating the feedback.

3. The method of claim 1, further comprising:
   determining that a message indicating feedback responsive to the message that requests the set of the semi-persistently scheduled resources has not been received within a threshold duration of time; and
   refraining from transmitting data over the set of the semi-persistently scheduled resources based at least in part on the determination.

4. The method of claim 1, further comprising:
   transmitting data in a first subset of the set of the semi-persistently scheduled resources based at least in part on transmitting the message that requests the set of the semi-persistently scheduled resources; and
   transmitting a second message indicating that a second subset of the set of the semi-persistently scheduled resources will not be used by the first device.

5. The method of claim 4, wherein the second message is transmitted over a third subset of the set of the semi-persistently scheduled resources.

6. The method of claim 1, wherein the set of the semi-persistently scheduled resources comprises the set of resources available to the first device for requesting the set of the semi-persistently scheduled resources.

7. The method of claim 1, further comprising:
   receiving a message indicating a type of message for transmission over the set of resources available to the first device to request the set of the semi-persistently scheduled resources.

8. The method of claim 1, wherein the set of the semi-persistently scheduled resources is associated with the set of resources available to the first device.

9. The method of claim 1, wherein the set of the semi-persistently scheduled resources comprises a quantity of consecutive instances of semi-persistently scheduled resources, the method further comprising:
   receiving a message indicating the quantity of consecutive instances or a duration of time that includes the quantity of consecutive instances.

10. The method of claim 1, further comprising:
    receiving a message indicating a periodicity associated with the set of resources available to the first device, wherein the message that requests the set of the semi-persistently scheduled resources is transmitted based at least in part on the periodicity.

11. The method of claim 1, further comprising:
    determining that the first device has data for the second device, wherein the message that requests the set of the semi-persistently scheduled resources is transmitted based at least in part on the determination.

12. An apparatus for wireless communication at a first device, comprising:
    a processor;
    memory coupled with the processor; and
    instructions stored in the memory and executable by the processor to cause the apparatus to:
      receive an indication of a configuration that schedules semi-persistently scheduled resources for data transmissions from the first device;
      receive, from a second device, an indication of a set of resources available to the first device for requesting a set of the semi-persistently scheduled resources configured for the first device, wherein the set of resources available to the first device are in an instance of the set of the semi-persistently scheduled resources; and transmit a message over the set of resources available to the first device to request the set of the semi-persistently scheduled resources.

13. The apparatus of claim 12, wherein the instructions are further executable by the processor to cause the apparatus to:

receive, from the second device, a message indicating feedback responsive to the message that requests the set of the semi-persistently scheduled resources; and transmit data over at least a subset of the set of the semi-persistently scheduled resources based at least in part on receiving the message indicating the feedback.

14. The apparatus of claim 12, wherein the instructions are further executable by the processor to cause the apparatus to:

determine that a message indicating feedback responsive to the message that requests the set of the semi-persistently scheduled resources has not been received within a threshold duration of time; and refrain from transmitting data over the set of the semi-persistently scheduled resources based at least in part on the determination.

15. The apparatus of claim 12, wherein the instructions are further executable by the processor to cause the apparatus to:

transmit data in a first subset of the set of the semi-persistently scheduled resources based at least in part on transmitting the message that requests the set of the semi-persistently scheduled resources; and transmit a second message indicating that a second subset of the set of the semi-persistently scheduled resources will not be used by the first device.

\* \* \* \* \*